US009881286B2

(12) United States Patent
Naito et al.

(10) Patent No.: US 9,881,286 B2
(45) Date of Patent: Jan. 30, 2018

(54) VEHICLE CHARGING CONTROL APPARATUS, VEHICLE CHARGING CONTROL METHOD, AND INFORMATION TERMINAL

(71) Applicant: Panasonic Corporation, Osaka (JP)

(72) Inventors: Eiichi Naito, Kyoto (JP); Masaki Kiyono, Kyoto (JP); Mikiya Nakata, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 675 days.

(21) Appl. No.: 13/974,533

(22) Filed: Aug. 23, 2013

(65) Prior Publication Data
US 2013/0346308 A1 Dec. 26, 2013

Related U.S. Application Data

(63) Continuation of application No. PCT/JP2012/006123, filed on Sep. 26, 2012.

(30) Foreign Application Priority Data

Oct. 20, 2011 (JP) .................................. 2011-230858

(51) Int. Cl.
G06Q 20/14 (2012.01)
H01M 10/44 (2006.01)
(Continued)

(52) U.S. Cl.
CPC .......... G06Q 20/145 (2013.01); B60L 11/184 (2013.01); B60L 11/1824 (2013.01);
(Continued)

(58) Field of Classification Search
CPC ........................... G06Q 10/02; G06Q 20/145
See application file for complete search history.

(56) References Cited

U.S. PATENT DOCUMENTS 5,650,710 A * 7/1997 Hotta .................... B60L 3/0046
320/128
8,174,235 B2 * 5/2012 Dyer .................... B60L 11/1809
180/65.21
(Continued)

FOREIGN PATENT DOCUMENTS

JP 2010-110173 5/2010
JP 2010-178450 8/2010
(Continued)

OTHER PUBLICATIONS

International Search Report dated Dec. 25, 2012 in International Application No. PCT/JP2012/006123.

Primary Examiner — Bruce I Ebersman
(74) Attorney, Agent, or Firm — Wenderoth, Lind & Ponack, L.L.P.

(57) ABSTRACT

A vehicle charging control apparatus includes: a unit which presents unit prices of charging power; a unit which issues an instruction for preferentially charging a vehicle for which allowable time is short in proportion to request amount; and a unit which determines whether there is another allowable time which is associated with the request amount and meets a condition that the other allowable time is longer than the allowable time and the unit price associated with the other allowable time is lower than the unit price associated with the request amount and the allowable time. The unit prices are set lower when associated with a longer allowable time and also set lower when associated with a smaller request amount. When the other allowable time meets the condition,
(Continued)

the other allowable time and the unit price associated with the other allowable time are presented.

10 Claims, 21 Drawing Sheets

(51) Int. Cl.
    *H02J 7/00*     (2006.01)
    *B60L 11/18*     (2006.01)
    *G07F 15/00*     (2006.01)
    *G07F 15/12*     (2006.01)
    *H02J 3/14*     (2006.01)

(52) U.S. Cl.
    CPC ............ *G07F 15/005* (2013.01); *G07F 15/12* (2013.01); *H01M 10/44* (2013.01); *H02J 7/0027* (2013.01); *B60L 2230/16* (2013.01); *B60L 2230/40* (2013.01); *B60L 2240/70* (2013.01); *B60L 2240/80* (2013.01); *H01M 2220/20* (2013.01); *H02J 3/14* (2013.01); *H02J 2003/146* (2013.01); *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 8,344,686 B2 | 1/2013 | Gaul et al. | |
| 8,511,539 B2* | 8/2013 | Redmann | G06Q 20/145 235/375 |
| 8,725,551 B2* | 5/2014 | Ambrosio | G06Q 30/02 705/7.31 |
| 8,751,088 B2* | 6/2014 | Choi | G06Q 50/30 180/65.21 |
| 9,786,961 B2* | 10/2017 | Dyer | H01M 10/486 |
| 2002/0099574 A1* | 7/2002 | Cahill et al. | 705/5 |
| 2009/0031310 A1 | 1/2009 | Lev et al. | |
| 2009/0313104 A1 | 12/2009 | Hafner et al. | |
| 2010/0211643 A1 | 8/2010 | Lowenthal et al. | |
| 2010/0306033 A1* | 12/2010 | Oved et al. | 705/10 |
| 2011/0025267 A1* | 2/2011 | Kamen | B60L 8/003 320/109 |
| 2012/0013301 A1 | 1/2012 | Gaul et al. | |
| 2012/0271723 A1* | 10/2012 | Penilla et al. | 705/16 |
| 2013/0009599 A1 | 1/2013 | Yukizane et al. | |

FOREIGN PATENT DOCUMENTS

| | | |
|---|---|---|
| JP | 2011-166971 | 8/2011 |
| JP | 2012-139020 | 7/2012 |
| WO | 2010/100081 | 9/2010 |
| WO | 2011/118187 | 9/2011 |

* cited by examiner

FIG. 3

| Request amount (kWh) | Time necessary for charging (min) | Allowable time (min) | | |
|---|---|---|---|---|
| | | 60 | 120 | 180 |
| 5 | 10 | 50 | 110 | 170 |
| 10 | 20 | 30 | 100 | 160 |
| 20 | 40 | 10 | 80 | 140 |
| 30 | 60 | 0 | 60 | 120 |

| Request amount (kWh) | Allowable time (min) | | |
|---|---|---|---|
| | 60 | 120 | 180 |
| 5 | 20 | 8 | 0 |
| 10 | 24 | 10 | 0 |
| 20 | 28 | 14 | 2 |
| 30 | 30 | 18 | 6 |

121

FIG. 10
(a) 10:15
| Input time | Vehicle identifier | Request amount (kWh) | Allowable time (min) | Unit price (¥/kWh) |
|---|---|---|---|---|
| 10:00 | A | 5 | 30 | 20 |
| 10:05 | B | 10 | 120 | 10 |
| 10:15 | C | 15 | 60 | 28 |
(b) 10:20
| Input time | Vehicle identifier | Request amount (kWh) | Allowable time (min) | Unit price (¥/kWh) |
|---|---|---|---|---|
| 10:00 | A | 5 | 30 | 20 |
| 10:05 | B | 10 | 120 | 10 |
| 10:15 | C | 15 | 60 | 28 |
| 10:20 | D | 10 | 60 | 24 |
(c) 10:30
| Input time | Vehicle identifier | Request amount (kWh) | Allowable time (min) | Unit price (¥/kWh) |
|---|---|---|---|---|
| 10:05 | B | 10 | 120 | 10 |
| 10:15 | C | 15 | 60 | 28 |
| 10:20 | D | 10 | 60 | 24 |

FIG. 12

|  | | Allowable time (min) | | |
|---|---|---|---|---|
|  | | 60 | 120 | 180 |
| Request amount (kWh) | 5 | 30 | 18 | 6 |
|  | 10 | 34 | 20 | 8 |
|  | 20 | 38 | 24 | 12 |
|  | 30 | 40 | 28 | 16 |

171

(a)

| | | Allowable time (min) | | | |
|---|---|---|---|---|---|
| | | 60 | 120 | 180 | 240 |
| Prices by request amount (¥) | 5 kWh | 100 | 8 | 0 | 0 |
| | 10 kWh | 240 | 100 | 0 | 0 |
| | 20 kWh | 560 | 280 | 40 | 40 |
| | 30 kWh | 900 | 540 | 360 | 360 |
| Parking fee (¥) | | 100 | 200 | 300 | 400 |

211
212

(b)

| | | Allowable time (min) | | | |
|---|---|---|---|---|---|
| | | 60 | 120 | 180 | 240 |
| Total amount (¥) | 5 kWh | 200 | 280 | 300 | 400 |
| | 10 kWh | 340 | 300 | 300 | 400 |
| | 20 kWh | 660 | 480 | 340 | 440 |
| | 30 kWh | 1000 | 740 | 660 | 760 |

213

VEHICLE CHARGING CONTROL APPARATUS, VEHICLE CHARGING CONTROL METHOD, AND INFORMATION TERMINAL

CROSS REFERENCE TO RELATED APPLICATIONS

This is a continuation application of PCT International Application No. PCT/JP2012/006123 filed on Sep. 26, 2012, designating the United States of America, which is based on and claims priority of Japanese Patent. Application No. 2011-230858 filed on Oct. 20, 2011. The entire disclosures of the above-identified applications, including the specifications, drawings and claims are incorporated herein by reference in their entirety.

FIELD

One or more exemplary embodiments disclosed herein relate generally to a vehicle charging control apparatus for charging a plurality of electric vehicles at the same time and controlling charging power so that demand for the charging power does not concentrate at a certain time to form a peak.

BACKGROUND

There is disclosed a conventional method for controlling charging power at a charging station where a plurality of electric vehicles (hereinafter also simply referred to as vehicles) is concurrently charged. In the method, the control of charging power is performed according to publicness of each electric vehicle being charged (for example, see Patent Literature 1: Japanese Unexamined Patent Application Publication No. 2010-110173). In the method disclosed in Patent Literature 1, the charging power for each of the electric vehicle is set according to a given priority within the limit of an available power amount from an external power supply.

CITATION LIST

Patent Literature

Japanese Unexamined Patent Application Publication No. 2010-110173

SUMMARY

Technical Problem

However, according to Patent Literature 1, charging power is controlled according to a priority predetermined for each vehicle. Thus, a vehicle having a higher priority is preferentially charged even when the user of the vehicle is not in a hurry, and charging of a vehicle having a lower priority is deferred even when the user of the vehicle is in a hurry. Thus, this method has a problem that a user's will or demand is not reflected in the prioritization.

One non-limiting and exemplary embodiment in the present disclosure provides a vehicle charging control apparatus which reflects a user's will in prioritization of charging and enhances the power supply-demand balance of a charging station.

Solution to Problem

In one general aspect, the techniques disclosed herein feature a vehicle charging control apparatus which controls charging of vehicles parked at a charging station includes: a charging power unit price setting unit configured to set unit prices of charging power to be each associated with a request amount of the charging power and an allowable time which is an amount of time that the user allows for the charging, the unit prices associated with equal ones of the request amounts being set lower when associated with a longer one of the allowable times, and the unit prices associated with equal ones of the allowable times being set lower when associated with a smaller one of the request amounts; a power charging information presentation unit configured to present, to a user of each of the vehicles, the unit prices each set to be associated with the request amount and the allowable time by the charging power unit price setting unit; a power charging request receiving unit configured to receive power charging requests from the users, each of the power charging requests specifying a request amount of the charging power and an allowable time for the charging; a power charging control unit configured to issue an instruction for preferentially charging a vehicle among the vehicles for which the specified allowable time is short in proportion to the request amount, based on the power charging requests received by the power charging request receiving unit; and a determination unit configured to determine, with reference to the unit prices each set to be associated with the request amount and the allowable time by the charging power unit price setting unit, whether or not there is another allowable time which is associated with the request amount specified in the power charging request and meets a first condition that (i) the other allowable time is longer than the allowable time specified in the power charging request and (ii) the unit price associated with the other allowable time is lower than the unit price associated with the request amount and the allowable time specified in the power charging request, wherein when the determination unit determines that there is the other allowable time which meets the first condition, the power charging information presentation unit is further configured to present, to the user, the other allowable time which meets the first condition and the unit price associated with the other allowable time which meets the first condition.

In this configuration, the charging power unit price setting unit sets charging power unit prices for respective combinations of an allowable time and a request amount so as to keep a power supply-demand balance of the charging station, and presents the charging power unit prices to a user. Considering the presented charging power unit prices, the user makes a power charging request specifying an allowable time and a request amount to the vehicle charging control apparatus. The power charging control unit performs charging power control within the limit specified in the power charging request from the user. Furthermore, the vehicle charging control apparatus may make a suggestion to the user to extend the allowable time in exchange for a lower unit price. By doing this, the vehicle charging control apparatus enhances the power supply-demand balance of the charging station while reflecting the user's will in prioritization of charging.

In another general aspect, the techniques disclosed here feature an information terminal for use in connection with the vehicle charging control apparatus and configured to receive, from the vehicle charging control apparatus, the information to ask the users for extension of the allowable times or information to ask the users for reduction of the request amounts.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The vehicle charging control apparatus according to one or more exemplary embodiments or features disclosed herein provides an enhanced power supply-demand balance of a charging station while reflecting a user's will in prioritization for charging.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a table showing surplus times for respective combinations of an allowable time and a request amount in Embodiment 1.

FIG. 4 shows power charging information on charging power unit prices for respective combinations of an allowable time and a request amount in Embodiment 1.

FIG. 10 shows an example of a power charging request list stored in a power charging request storing unit in Embodiment 1.

FIG. 12 shows power charging information on charging power unit prices for respective combinations of an allowable time and a request amount in the variation of Embodiment 1.

Figure 1:
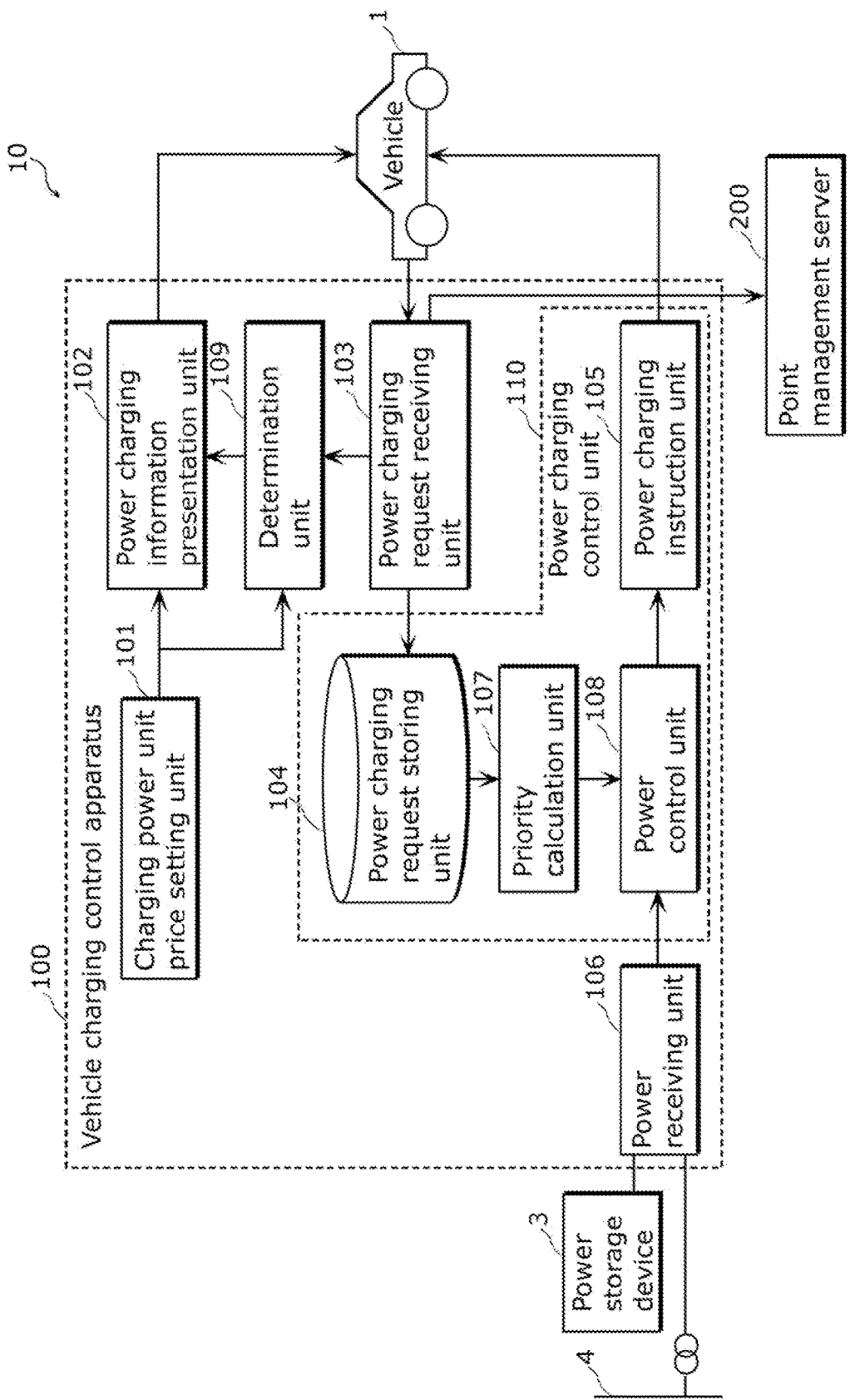
FIG. 1 is a block diagram of a charging station to which a vehicle charging control apparatus in Embodiment 1 is provided.

DESCRIPTION OF EMBODIMENTS (Underlying Knowledge Forming Basis of the Present Disclosure)

In relation to the method for controlling charging power disclosed in the Background section, the inventors have found the following problem.

It is expected that vehicles will include high-capacity batteries and this will lead to more demands for recharging of the vehicles at charging stations while on the go.

Examples of such charging stations include a charging station attached to a commercial facility and large enough to accommodate dozens of vehicles. However, a charging facility of a capacity large enough to meet intensive demands for charging requested by all vehicles at the charging station will be expensive to build. For example, a commercial facility with 30-kW chargers for 100 vehicles is a realistic expectation. However, concurrent charging of 100 vehicles requires electricity of 30 kW×100, that is, 3000 kW, which is unrealistic in the light of an installed capacity of a charging facility or procurement of electricity.

It is thus desirable that a charging station accommodate requests from users so as to avoid as much as possible causing inconvenience to the users within a certain installed capacity.

However, according to Patent Literature 1, charging power is controlled according to a priority predetermined for each vehicle. Thus, a vehicle having a higher priority is preferentially charged even when the user of the vehicle is not in a hurry, and charging of a vehicle having a lower priority is deferred even when the user of the vehicle is in a hurry. Thus, this method has a problem that a user's will or demand is not reflected in the prioritization of charging.

According to an exemplary embodiment disclosed herein, a vehicle charging control apparatus which controls charging of vehicles parked at a charging station includes: a power charging information presentation unit configured to present, to a user of each of the vehicles, unit prices of charging power each of which is associated with a request amount of the charging power and an allowable time which is an amount of time that the user allows for the charging, the unit prices associated with equal ones of the request amounts being set lower when associated with a longer one of the allowable times, and the unit prices associated with equal ones of the allowable times being set lower when associated with a smaller one of the request amounts; a power charging request receiving unit configured to receive power charging requests from the users, each of the power charging requests specifying a request amount of the charging power and an allowable time for the charging; a power charging control unit configured to issue an instruction for preferentially charging a vehicle among the vehicles for which the specified allowable time is short in proportion to the request amount, based on the power charging requests received by the power charging request receiving unit; and a determination unit configured to determine, with reference to the set unit prices, whether or not there is another allowable time which is associated with the request amount specified in the power charging request and meets a first condition that (i) the other allowable time is longer than the allowable time specified in the power charging request and (ii) the unit price associated with the other allowable time is lower than the unit price associated with the request amount and the allowable time specified in the power charging request, wherein when the determination unit determines that there is the other allowable time which meets the first condition, the power charging information presentation unit is further configured to present, to the user, the other allowable time which meets the first condition and the unit price associated with the other allowable time which meets the first condition.

In this configuration, unit prices are set for respective combinations of an allowable time and a request amount so as to keep the power supply-demand balance of the charging station. Considering the set unit prices, the user and makes a power charging request specifying an allowable time and a request amount to the vehicle charging control apparatus. The power charging control unit performs charging power control within the limit specified in the power charging request from the user. Furthermore, the vehicle charging control apparatus may make a suggestion to the user to extend the allowable time in exchange for a lower unit price. By doing this, the vehicle charging control apparatus enhances the power supply-demand balance of the charging station while reflecting the user's will in prioritization of charging.

For example, the unit prices associated with equal ones of the request amounts may be set lower when associated with a longer surplus time, the surplus time being calculated by subtracting an amount of time necessary for charging of the request amount from the allowable time.

In this configuration, a vehicle which allows slower charging when the power supply-demand situation is tight is recharged at a lower unit price. This will stimulate users to be willing to accept slower charging. As a result, the power supply-demand balance of the charging station will be enhanced.

Furthermore, the unit prices associated with equal ones of the request amounts and equal ones of the allowable times may be set lower when a combined charging power for the charging according to the power charging requests received by the power charging request receiving unit is smaller.

In this configuration, a unit price of charging power is determined in consideration not only of an allowable time and a request amount of a power charging request but also of a supply-demand situation of the charging station at a time of receiving the power charging request. As a result, a unit price is set so as to further keep a power supply-demand balance of the charging station. More specifically, power demand can be kept low by increasing unit price when the power supply-demand situation is tight.

More specifically, the unit prices associated with equal ones of the request amounts and equal ones of the allowable times may be set lower when a remaining power is larger, the remaining power being calculated by subtracting the combined charging power from a maximum power which can be concurrently supplied to the vehicles parked at the charging station.

Furthermore, the power charging information presentation unit may be configured to further present, to the user, incentive information which indicates an incentive for the user to extend the allowable time.

Furthermore, the determination unit may be further configured to determine, with reference to the set unit prices, whether or not there is another request amount which is associated with the allowable time specified in the power charging request and meets a second condition that (i) the other request amount is smaller than the request amount specified in the power charging request and (ii) the unit price associated with the other allowable time is lower than the unit price associated with the request amount and the allowable time specified in the power charging request, and when the determination unit determines that there is the other request amount which meets the second condition, the power charging information presentation unit may be further configured to present the amount of charging power which meets the second condition and the unit price associated with the other allowable time which meets the second condition.

In this configuration, the vehicle charging control apparatus may make a suggestion to the user to reduce the request amount in exchange for a lower unit price. Thus, the vehicle charging control apparatus enhances the power supply-demand balance of the charging station while reflecting the user's will in prioritization of charging.

Furthermore, the vehicle charging control apparatus may further include a calculation unit configured to calculate, for each combination of the request amount and the allowable time, a total amount of a power price and a parking fee, the power price being a product of the set unit price and the request amount, the parking fee being a fee for parking of a vehicle at the charging station for the allowable time, wherein the power charging information presentation unit may be configured to present, to the user, information indicating the total amounts calculated by the calculation unit.

In this configuration, not only a power price but also a parking fee is presented to a user in total. This allows the user to select the most favorable power charging plan.

Furthermore, the calculation unit may be further configured to calculate a minimum of the total amount for each of the request amounts, and the power charging information presentation unit may be configured to present, to the user, the minimum of the total amount calculated for each of the request amounts by the calculation unit instead of the unit price.

This configuration allows the user to see the lowest total amount when requesting charging of a certain amount of power.

Furthermore, the vehicle charging control apparatus may further include a communication unit configured to transmit and receive information, wherein when a remaining power decreases below a predetermined value while the vehicles parked at the charging station are being charged, the power charging information presentation unit may be configured to transmit, via the communication unit, information to ask the users for extension of the allowable times or information to ask the users for reduction of the request amounts to information terminals each associated with a corresponding one of the vehicles being charged, the remaining power being calculated by subtracting, from a maximum power which can be concurrently supplied to the vehicles, a combined charging power for the charging according to the power charging requests received by the power charging request receiving unit, and the power charging request receiving unit may be configured to receive the power charging request from the information terminals via the communication unit.

This configuration allows a user to change the user's power charging request not only when the user is present at the charging station with the user's vehicle but also when the user is away from the vehicle in the midst of charging. With this, it is possible to suggest a user to change the user's power charging request when the power supply-demand situation is tight. As a result, it is possible to prevent power demand from becoming excessive.

According to another exemplary embodiment disclosed herein, a vehicle charging control apparatus which controls charging of vehicles parked at a charging station includes: a charging power unit price setting unit configured to set unit prices of charging power to be each associated with a request amount of the charging power and an allowable time which is an amount of time that the user allows for the charging, the unit prices associated with equal ones of the request amounts being set lower when associated with a longer one of the allowable times, and the unit prices associated with equal ones of the allowable times being set lower when associated with a smaller one of the request amounts; a power charging information presentation unit configured to present, to a user of each of the vehicles, the unit prices each set to be associated with the request amount and the allowable time by the charging power unit price setting unit; a power charging request receiving unit configured to receive power charging requests from the users, each of the power charging requests specifying a request amount of the charging power and an allowable time for the charging; a power charging control unit configured to issue an instruction for preferentially charging a vehicle among the vehicles for which the specified allowable time is short in proportion to the request amount, based on the power charging requests received by the power charging request receiving unit; and a determination unit configured to determine, with reference to the unit prices each set to be associated with the request amount and the allowable time by the charging power unit price setting unit, whether or not there is another allowable time which is associated with the request amount specified in the power charging request and meets a first condition that (i) the other allowable time is longer than the allowable time specified in the power charging request and (ii) the unit price associated with the other allowable time is lower than the unit price associated with the request amount and the allowable time specified in the power charging request, wherein when the determination unit determines that there is the other allowable time which meets the first condition, the power charging information presentation unit is further configured to present, to the user, the other allowable time which meets the first condition and the unit price associated with the other allowable time which meets the first condition.

In this configuration, the charging power unit price setting unit sets a charging power unit prices for respective combinations of an allowable time and a request amount so as to keep a power supply-demand balance of the charging station, and presents the charging power unit prices to a user. Considering the presented charging power unit prices, the user makes a power charging request specifying an allowable time and a request amount to the vehicle charging control apparatus. The power charging control unit performs charging power control within the limit specified in the power charging request from the user. Furthermore, the vehicle charging control apparatus may make a suggestion to the user to extend the allowable time in exchange for a lower unit price. By doing this, the vehicle charging control apparatus enhances the power supply-demand balance of the charging station while reflecting the user's will in prioritization of charging.

An information terminal according to another aspect of the present disclosure is used in connection with the vehicle charging control apparatus and is configured to receive, from the vehicle charging control apparatus, the information to ask the users for extension of the allowable times or information to ask the users for reduction of the request amounts.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

FIG. 1 is a block diagram of a charging station to which a vehicle charging control apparatus according to Embodiment 1 is provided.

A charging station 10 is provided with a vehicle charging control apparatus 100.

At the charging station 10, a vehicle 1 is parked and recharged by the vehicle charging control apparatus 100. FIG. 1 shows a single vehicle of the vehicle 1 for simplicity. In practice, a plurality of the vehicles 1 is parked at the charging station 10 and connected to the vehicle charging control apparatus 100 to be recharged.

A power storage device 3 and a power grid 4 are connected to the vehicle charging control apparatus 100, and either or both of them supply power for recharging of the vehicle 1.

The vehicle charging control apparatus 100 is an apparatus which controls charging of a plurality of vehicles parked at the charging station 10 and includes a charging power unit price setting unit 101, a power charging information presentation unit 102, a power charging request receiving unit 103, a power charging control unit 110, a power receiving unit 106, and a determination unit 109.

The charging power unit price setting unit 101 sets unit prices of charging power. Each of the unit prices is associated with a request amount of power and an allowable time for charging.

The allowable time is defined as an amount of time that a user of the vehicle 1 allows for charging of the vehicle 1 at the charging station 10.

The power charging information presentation unit 102 presents, to the user, power charging information which is information on unit prices each set to be associated with a request amount and an allowable time by the charging power unit price setting unit 101. A concrete example of the power charging information will be given later.

The power charging request receiving unit 103 receives, from users, power charging requests each specifying a request amount and an allowable time for charging.

The power charging control unit 110 performs control so as to preferentially charge a vehicle for which a user of the vehicle has specified an allowable time short in proportion to a request amount, based on the power charging requests received by the power charging request receiving unit 103.

The power receiving unit 106 draws charging power for the vehicle 1 from the power storage device 3 or the power grid 4.

The determination unit 109 determines whether or not there is another allowable time which is associated with the request amount specified in the power charging request and meets a first condition, with reference to the unit prices each set to be associated with a request amount and an allowable time by the charging power unit price setting unit 101. The first condition is that (i) the other allowable time is longer than the allowable time specified in the power charging request, and (ii) the unit price associated with the other allowable time is lower than the unit price associated with the request amount and the allowable time specified in the power charging request. Furthermore, the determination unit 109 determines whether or not there is another request amount which is associated with the allowable time specified in the power charging request and meets a second condition, with reference to unit prices each set to be associated with a request amount and an allowable time by the charging power unit price setting unit 101. The second condition is that (i) the other request amount is smaller than the request amount specified in the power charging request, and (ii) the unit price associated with the other request amount is lower than the unit price associated with the request amount and the allowable time specified in the power charging request.

The power charging control unit 110 includes a power charging request storing unit 104, a power charging instruction unit 105, a priority calculation unit 107, and a power control unit 108.

The power charging request storing unit 104 is a storage device which stores power charging requests from the users of the plurality of the vehicles 1, and is implemented as a random access memory (RAM), a hard disk drive (HDD), or the like.

The power charging instruction unit 105 charges the vehicles 1.

The priority calculation unit 107 sets priorities to the vehicles 1 by comparing power charging requests from the users of the respective vehicles 1.

The power control unit 108 controls charging power according to the priorities so that the vehicles are more preferentially charged the vehicle 1 having a higher priority among them.

Operation of the vehicle charging control apparatus 100 in the above-described configuration according to Embodiment 1 will be described below using a flowchart in FIG. 2.

For example, the vehicle charging control apparatus 100 is started up before operating hours of the charging station starts and keeps operating until an administrator instructs to shut down after the operating hours.

(Step S101) The charging power unit price setting unit 101 sets unit prices of charging power. Each of the unit prices is associated with a request amount and an allowable time that a user allows for charging. The charging power unit price setting unit 101 sets each of the unit prices to be associated with a request amount and an allowable time so that the unit prices associated with equal ones of the request amounts are set lower when associated with a longer allowable time and so that the unit prices associated with equal ones of the allowable times are set lower when associated with a smaller request amount. Note that the lower unit prices are not always lower than when associated with a longer allowable time or a smaller request amount, and may be the same when compared locally. However, on the whole, there is such tendency in the unit price system. For example, the unit prices are 20 yen, 15 yen, 15 yen, and 5 yen for allowable times with 60-minute increments, such as 60 minutes, 120 minutes, 180 minutes, and 240 minutes. In this case, the unit price for the allowable time of 120 minutes and the unit price for the allowable time of 180 minutes are both 15 yen. However, on the whole the unit price lowers as the allowable time increases. This is deemed as decrease in unit price with increase in allowable time. The same holds true for decrease in unit price with decrease in request amount. These expressions are deemed in the same manner in the description below.

The charging power unit price (the unit price of charging power) is set loser for a longer allowable time because such a longer allowable time allows the charging station 10 to perform an operation for control of charging in Step S110 when the power supply-demand situation is tight. Step S110 will be described later.

The charging power unit price is set lower for a smaller request amount because a larger request amount increases the possibility of a tight power supply-demand situation.

Thus, it is desirable from the viewpoint of stability of power supply-demand situation that a power charging request from each of the vehicles 1 specifies a longer allowable time and a smaller request amount. In other words, the charging power unit price setting unit 101 sets a lower charging power unit price for the vehicle 1 which is in favor of stability of charging power.

The following example shows a method of setting of a charging power unit price using Equations 1 to 3 shown below.

Charging power unit price (yen/kWh)=base rate (e.g. 30 yen/kWh)−surplus time (minute)×coefficient 1 (e.g. 0.2 yen/kWh/minute)  (Equation 1)

(When a calculated charging power unit price is less than zero, the charging power unit price is deemed to be zero)

Surplus time (minute)=allowable time (minute)−time necessary for charging of request amount (minute)  (Equation 2)

Time necessary for charging of request amount (minute)=request amount (kWh)/power charging speed (kW) (e.g. 30 kW)  (Equation 3)

By using Equations 1 to 3, the charging power unit price setting unit 101 sets a lower charging power unit price for a longer allowable time, and a lower charging power unit price for a smaller request amount.

FIGS. 3 and 4 show results obtained using Equations 1 to 3.

FIG. 3 is a table showing a relationship between allowable time, request amount, and surplus time. A field 111 lists times necessary for charging of request amounts. For example, the field 111 shows that the time necessary for charging of a request amount of 5 kWh is 10 minutes, and the time necessary for charging of a request amount of 10 kWh is 20 minutes. A field 112 lists surplus times for combinations of an allowable time and a request amount. For example, the field 112 shows that the surplus time for a combination of an allowable time of 60 minutes and a request amount of 5 kWh is 50 minutes. This is equal to the result of a subtraction of the amount of time necessary for charging of a request amount of 5 kWh, that is, 10 minutes from an allowable time of 60 minutes. Similarly, the field 112 shows that the surplus time for a combination of an allowable time of 120 minutes and a request amount of 10 kWh is 100 minutes.

In this manner, unit prices are determined based on surplus times so that a vehicle which allows slower charging when the power supply-demand situation is tight can be charged at a lower unit price. This will stimulate users to be willing to accept slower charging. As a result, the power supply-demand balance of the charging station will be enhanced.

FIG. 4 shows power charging information. The power charging information is information on a unit price set to be associated with a request amount and an allowable time by the charging power unit price setting unit 101. A field 121 lists charging power unit prices for combinations of an allowable time and a request amount. For example, the field 121 shows that the charging power unit price for a combination of an allowable time of 60 minutes and a request amount of 5 kWh is 20 yen.

Although FIGS. 3 and 4 show resultant surplus times and charging power unit prices for combinations of an allowable time and a request amount each having a discrete value, it is possible to determine surplus times and charging power unit prices for continuous-valued allowable times and continuous-valued request amount by using above-described Equations 1 to 3. However, Embodiment 1 will be further described using discrete values for the sake of understanding, (Step S102) The power charging information presentation unit 102 presents power charging information to the user of the vehicle 1 which has just come up to the charging station 10. More specifically, the power charging information presentation unit 102 sends the vehicle 1 power charging information as shown in FIG. 4, FIG. 5 shows an exemplary screen display of power charging information presented to a user through an operating device for charging of the vehicle 1, such as a terminal installed at the charging station 10, an on-vehicle terminal of the vehicle 1, or a mobile information terminal carried by the user.

Figure 5:
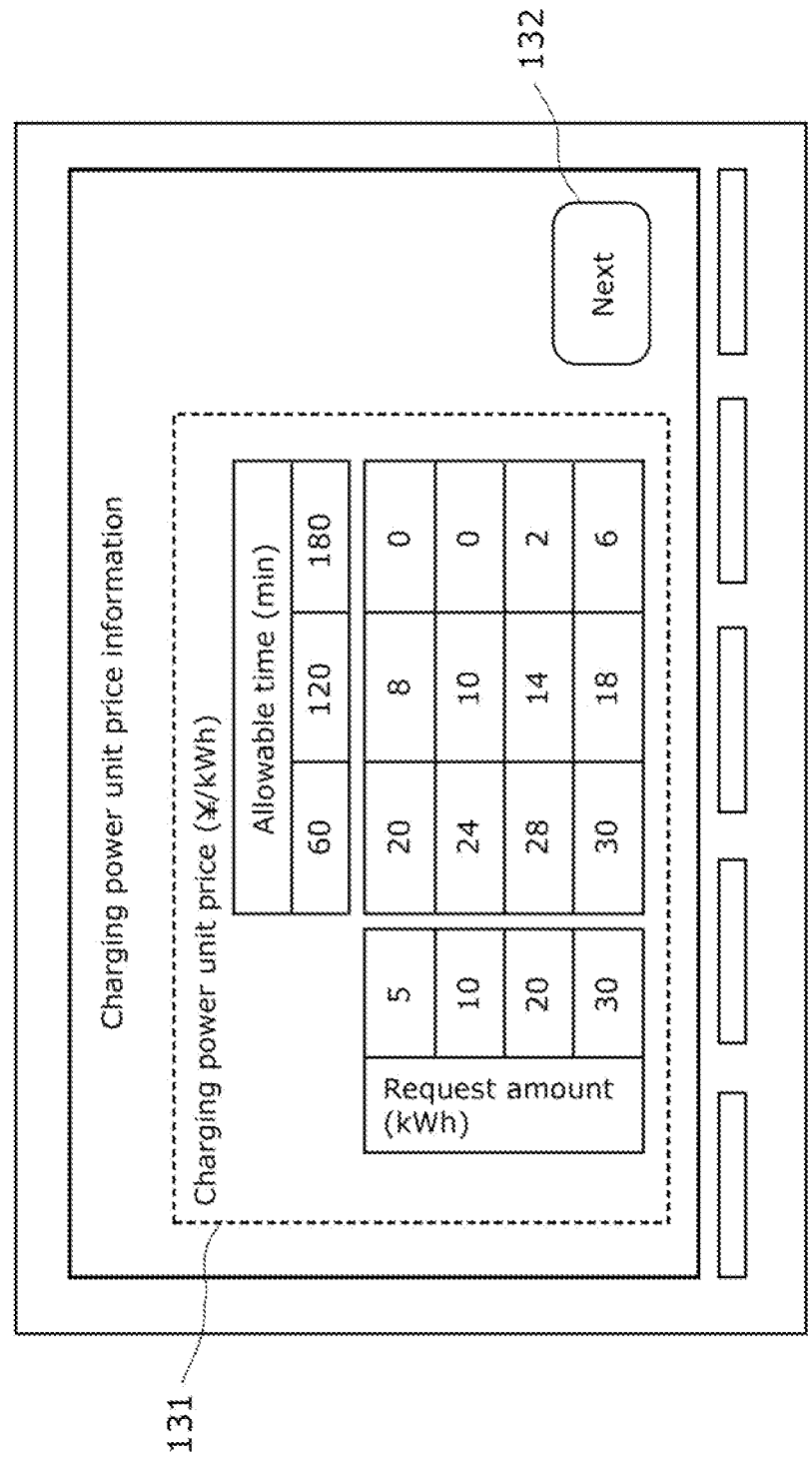
FIG. 5 shows an exemplary screen display of power charging information in Embodiment 1.

In FIG. 5, a field 131 shows power charging information which is the information on unit prices each set to be associated with a request amount and an allowable time by the charging power unit price setting unit 101 in Step S101. When the user checks the unit prices in the power charging information and presses a "Next" button 132, the operating device returns a signal to proceed to Step S103 to the vehicle charging control apparatus 100.

The unit prices are displayed on the operating device as a guideline for a user to enter a power charging request in next Step S103, and the way of displaying the information is not limited to the form of the power charging information shown in the field 131. For example, the operating device may display only selected information such as allowable times and request amounts specified by many users or allowable times and request amounts which a company running the charging station 10 wants to show as options available to a user. The form of information is not limited to such a tabular form. Alternatively, the information may be displayed in another form to present unit prices, such as in graph form.

(Step S103) The power charging request receiving unit 103 receives power charging requests from the user of the vehicle 1. In the power charging request, an allowable time and a request amount are specified.

Figure 6:
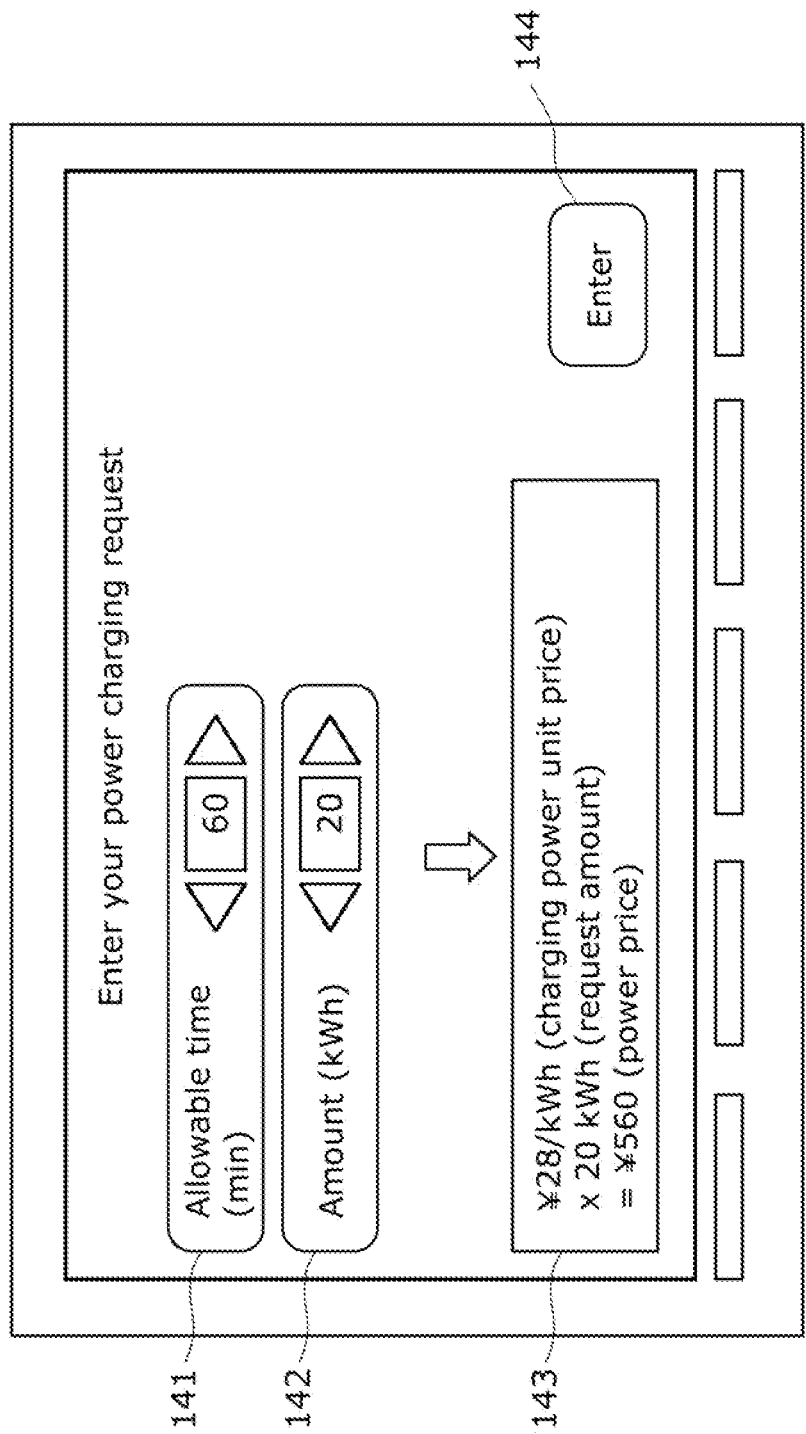
FIG. 6 shows an exemplary screen display displayed to receive a power charging request in Embodiment 1.

FIG. 6 shows an exemplary screen display on the operating device displayed to receive a power charging request from the user through the operating device.

Using the screen display shown in FIG. 6, the user sets, as a power charging request, an "Allowable time" (=60 minutes) in a setting field 141 and a "Request amount" (=20 kWh) in a setting field 142. Then, a display field 143 shows a charging power unit price (=28 yen/kWh) corresponding to the allowable time and the request amount, and a power price (=560 yen), which is a product of the charging power unit price and the request amount. When the user checks the display in the display field 143 and presses an "Enter" button 144, the operating device transmits the power charging request to the power charging request receiving unit 103 and the power charging request receiving unit 103 receives the power charging request. The operating device also sends back a signal to proceed to Step S104 to the vehicle charging control apparatus 100.

(Step S104A) The determination unit 109 determines whether or not the unit price will be discounted when either the received allowable time or the received request amount is changed, with reference to the power charging request received by the power charging request receiving unit 103 and the corresponding unit price. In other words, the determination unit 109 determines whether or not there is any power charging plan to suggest, by determining whether or not there is another allowable time which meets the first condition or whether or not there is another request amount which meets the second condition.

Figure 7:
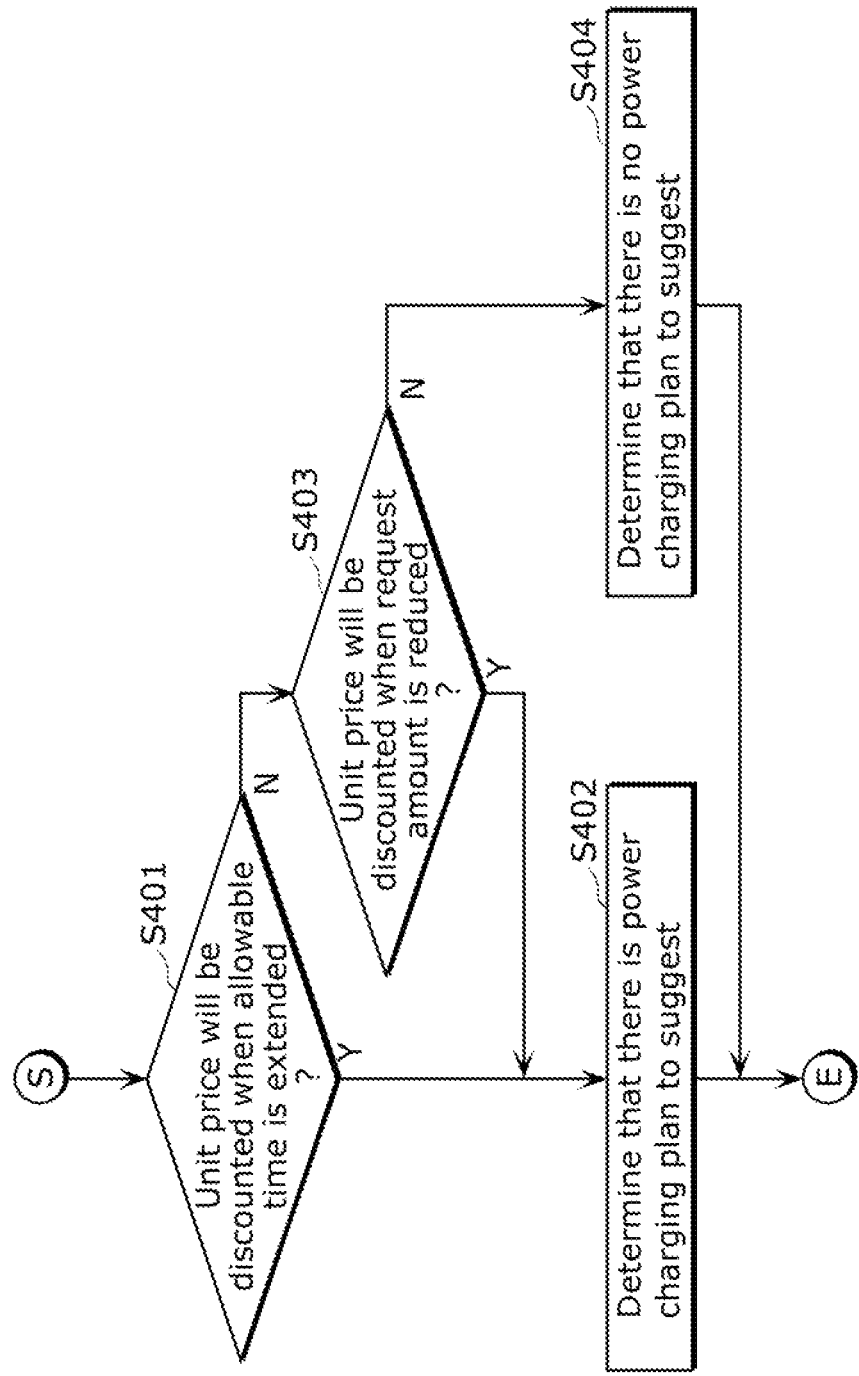
FIG. 7 is a flowchart showing a flow of processing to be performed by a determination unit in Embodiment 1.

More specifically, the determination unit 109 performs processing shown in FIG. 7.

(Step S401) The determination unit 109 determines whether or not the unit price for charging of the request amount specified in a power charging request will be discounted when the allowable time specified in the power charging request is extended, with reference to the unit prices each set to be associated with a request amount and an allowable time by the charging power unit price setting unit 101. In other words, the determination unit 109 determines whether or not there is another allowable time which meets the first condition. Assume, as an example, that a power charging request specifies a request amount of 20 kWh and an allowable time of 120 minutes. In this case, according to the power charging information shown in FIG. 4, the unit price will be discounted from 14 yen to 2 yen when the allowable time is extended to 180 minutes, and therefore the determination unit 109 determines that the unit price is discountable (or that there is another allowable time which meets the first condition). Assume, as another example, that a power charging request specifies a request amount of 20 kWh and an allowable time of 180 minutes. In this case, the unit price remains 2 yen even when the allowable time is extended, and therefore the determination unit 109 determines that the unit price is not discountable (or that there is no allowable time which meets the first condition).

When the determination unit 109 determines that the unit price is discountable, the processing then proceeds to Step S402. When the determination unit 109 determines that the unit price is not discountable, the processing then proceeds to Step S403.

(Step S402) The determination unit 109 determines that "there is a power charging plan to suggest".

(Step S403) The determination unit 109 determines whether or not the unit price for charging in the allowable time specified in a power charging request will be discounted when the request amount specified in the power charging request is reduced, with reference to the unit prices each set to be associated with a request amount and an allowable time by the charging power unit price setting unit 101. In other words, the determination unit 109 determines whether or not there is another request amount which meets the second condition. Assume, as example, that a power charging request specifies a request amount of 20 kWh and an allowable time of 120 minutes. In this case, according to the power charging information shown in FIG. 4, the unit price will be discounted from 14 yen to 10 yen when the request amount is reduced to 10 kWh, and therefore the determination unit 109 determines that the unit price is discountable (or that there is another request amount which meets the second condition). Assume, as another example, that a power charging request specifies a request amount of 5 kWh and an allowable time of 120 minutes. In this case, the unit price remains 8 yen even when the request amount is reduced, and therefore the determination unit 109 determines that the unit price is not discountable (or that there is no request amount which meets the second condition).

When the determination unit 109 determines that the unit price is discountable, the processing then proceeds to Step S402. When the determination unit 109 determines that the unit price not discountable, the processing then proceeds to Step S403.

(Step S404) The determination unit 109 determines that "there is no power charging plan to suggest".

After the determination is made in Step S104A, the processing then proceeds to Step S104B.

(Step S104B) When the determination unit 109 determines that "there is a power charging plan to suggest" in Step S104A, the processing then proceeds to Step S105. When the determination unit 109 determines that "there is no power charging plan to suggest" in Step S104A, the processing then proceeds to Step S107.

(Step S105) The power charging information presentation unit 102 transmits power charging plan information to the operating device so that the power charging plan information is presented to the user by the operating device displaying the power charging plan information. More specifically, when the unit price will be discounted if the allowable time is extended (that is, when there is another allowable time which meets the first condition), the power charging information presentation unit 102 presents, to the user, information on the other allowable time for which the unit price will be discounted and a discount unit price associated with each other. Furthermore, the power charging information presentation unit 102 presents, to the user, incentive information which indicates an incentive for the user to extend the allowable time.

Figure 8:
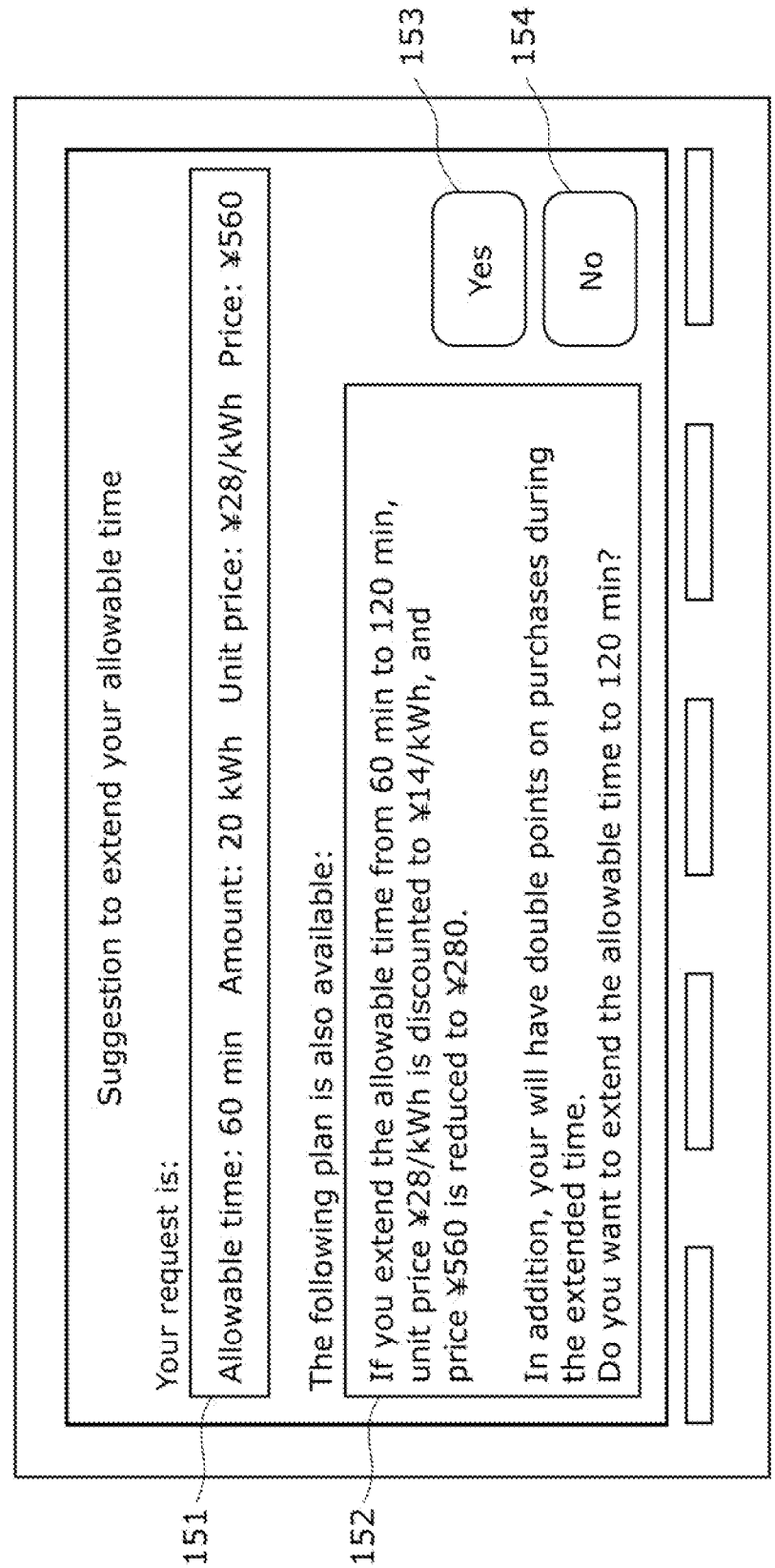
FIG. 8 shows an exemplary screen display to suggest extension of an allowable time in Embodiment 1.

FIG. 8 shows an exemplary screen display of the operating device to suggest extension of an allowable time as an example of the information on an allowable time for which a unit price will be discounted and a discount unit price associated with each other.

When a user specifies an allowable time of 60 minutes and a request amount of 20 kWh in a power charging request in Step S103, the charging power unit price will be discounted from 28 yen/kWh to 14 yen/kWh if the allowable time is extended from 60 minutes to 120 minutes In FIG. 8, a display field 151 shows a display screen to confirm the power charging request input by the user in Step S103.

A display field 152 shows information on benefit to be given to the user in return for accepting the suggestion to extend the allowable time. More specifically, the display field 152 shows that if the allowable time is extended from 60 minutes to 120 minutes, the charging power unit price will be discounted from 28 yen/kWh to 14 yen/kWh and thereby the power price will be reduced from 560 yen to 280 yen. The display field 152 also shows that if the allowable time is extended from 60 minutes to 120 minutes, the user will earn double points on purchases.

The vehicle charging control apparatus 100 thus makes a suggestion to the user to extend the allowable time in exchange for a lower unit price. With this, the power supply-demand balance of the charging station can be enhanced while the user's will is reflected.

Furthermore, when the unit price is discounted if the request amount is reduced (that is, when a there is another request amount which meets the second condition), the power charging information presentation unit 102 presents, to the user, information on the other request amount for which the unit price will be discounted and a discount unit price associated with each other.

Figure 9:
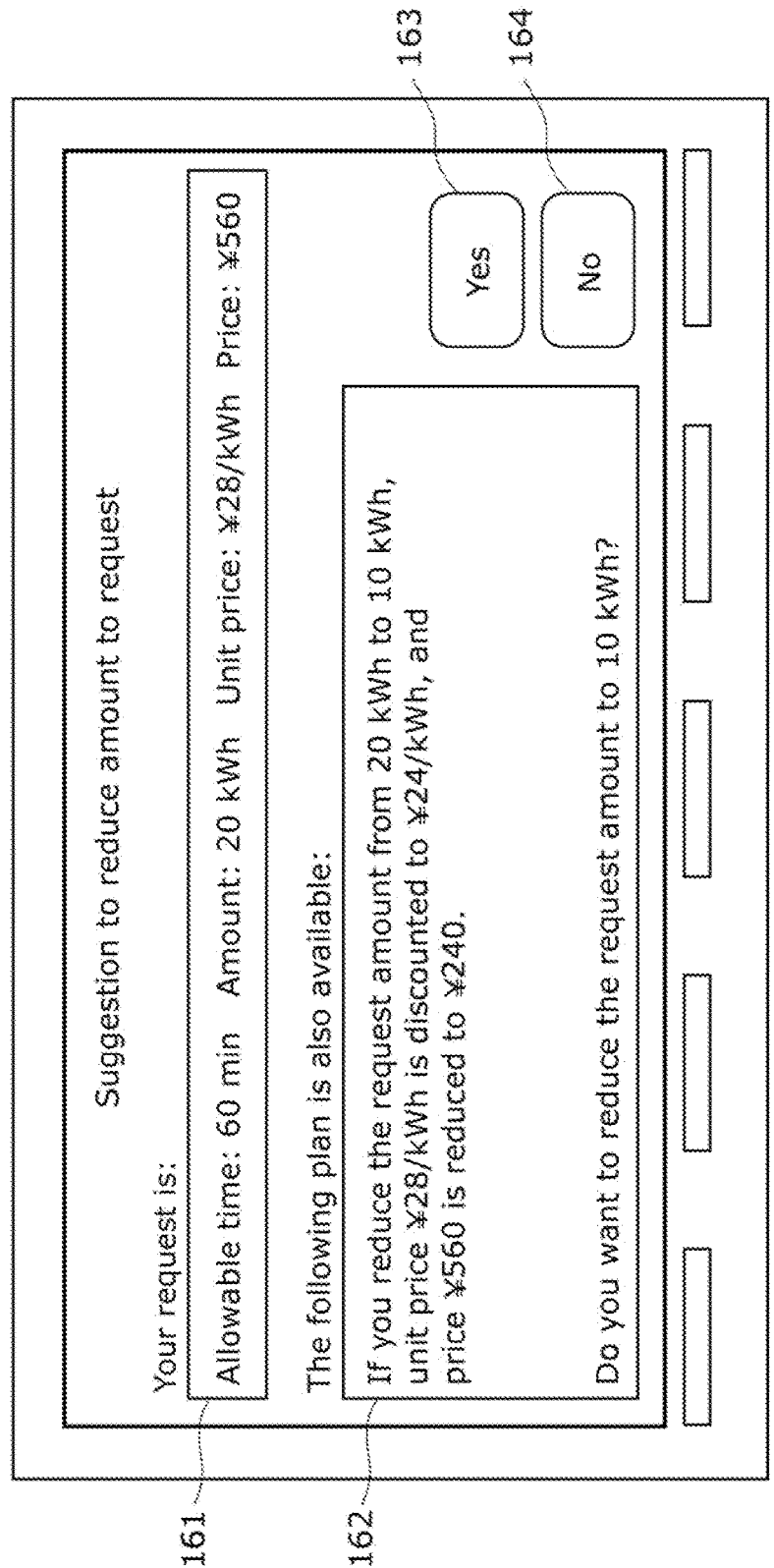
FIG. 9 shows an exemplary screen display to suggest reduction of a request amount in Embodiment 1.

FIG. 9 shows an exemplary screen display of the operating device to suggest reduction of a request amount as an example of the information on the request amount for which the unit price will be discounted and a discount unit price associated with each other.

When a user specifies an allowable time of 60 minutes and a request amount of 20 kWh in a power charging request in Step S103, the charging power unit price will be discounted from 28 yen/kWh to 24 yen/kWh if the request amount is reduced from 20 kWh to 10 kWh.

In FIG. 9, a display field 161 shows a display screen as shown in the display field 151 in FIG. 8 to confirm the power charging request input by the user in Step S103.

A display field 162 shows information on benefit to be given to the user in return for accepting the suggestion to reduce the request amount. More specifically, the display field 162 shows that if the request amount is reduced from 20 kWh to 10 kWh, the charging power unit price will be discounted from 28 yen/kWh to 24 yen/kWh and thereby the power price will be reduced from 560 yen to 240 yen.

The vehicle charging control apparatus 100 thus makes a suggestion to the user to reduce the request amount in exchange for a lower unit price. With this, the power supply-demand balance of the charging station can be enhanced while the user's will is reflected.

(Step S106) The power charging request receiving unit 103 receives an input from the user in response to the power charging plan information presented to the user in Step S105.

In FIG. 8, when the user presses a "Yes" button 153, the power charging request receiving unit 103 receives the extended allowable time and changes the allowable time specified in the power charging request of the user to the extended allowable time. Furthermore, the power charging request receiving unit 103 requests a point management server 200 to double points on purchases of the user. The point management server 200 manages point information of users. When the user presses a "No" button 154, the power charging request of the user remains unchanged.

In FIG. 9, when the user presses a "Yes" button 163, the power charging request receiving unit 103 receives the reduced request amount and changes the request amount specified in the power charging request of the user to the reduced request amount. When the user presses a No button 164, the power charging request of the user remains unchanged.

(Step S107) The power charging request receiving unit 103 adds the received power charging request to a power charging request list stored in the power charging request storing unit 104.

(a) in FIG. 10 is an example of the power charging request list. The power charging request list includes input times, vehicle identifiers, request amounts, allowable times, and charging power unit prices. Each of the input times is a time at which a power charging request from a vehicle is added to the power charging request list. Each of the vehicle identifiers is an identifier for a vehicle from which a power charging request is received. For example, a vehicle number on a license plate may be used as the identifier. Furthermore, the vehicle identifier is not limited to an identifier for a vehicle and may be an identifier for anything associated with a vehicle. For example, the vehicle identifier may be an identifier for membership of a power charging service. The request amounts and allowable times are those specified in power charging requests. The charging power unit prices are charging power unit prices based on power charging requests when received. (a) in FIG. 10 is a power charging request list at a time point of 10:15. For example, the power charging request list holds the following power charging requests: a power charging 1.0 request received from a vehicle "A" at 10:00; a power charging request received from a vehicle "B" at 10:05; and a power charging request received from a vehicle "C" at 10:15. For example, the power charging request list has an entry indicating that a request amount of 5 kWh and an allowable time of 30 minutes are specified in the power charging request from the vehicle "A". The entry also indicates a charging power unit price of 20 yen/kWh for this case.

(b) in FIG. 10 is an example of the power charging request list to which a power charging request from a vehicle "D" newly received at 10:20 has been added.

(Step S108) When charging of the vehicle 1 is completed or the vehicle 1 exits, the power charging request receiving unit 103 deletes an entry of a power charging request corresponding to the vehicle from the power charging request list stored in the power charging request storing unit 104.

(c) in FIG. 10 is an example of a power charging request list from which an entry of a power charging request from the vehicle "A" is deleted at 10:30 after the charging of the vehicle "A" is completed.

(Step S109) The priority calculation unit 107 sets priorities of power charging requests with reference to the power charging request list stored in the power charging request staring unit 104.

The priorities are set by calculating the above-described surplus times and assigning the highest priority to the request of the shortest surplus time. In other words, the larger the request amount or the shorter the allowable time, the higher the priority.

For example, comparing the power charging request from the vehicle "B" and the power charging request from the vehicle "C" in the request list shown in (c) in FIG. 10, the surplus time of the vehicle "B" is determined from the formula of an allowable time of 120 (minute)–a request amount 10 (kWh)/a power charging speed of 30 (kW)×60 (minute), and the surplus time of the vehicle "C" is determined from the formula of an allowable time of 60 (minute)–a request amount 15 (kWh)/a power charging speed of 30 (kW)×60 (minute). Hence, the surplus time of the vehicle "B" is 100 minutes and the surplus time of the vehicle "C" is 30 minutes, and therefore the power charging request from the vehicle "C" is assigned with a higher priority.

(Step S110) The power control unit 108 selects one or more power charging requests with highest priorities so that the combined charging power does not exceed the installed capacity of the vehicle charging control apparatus 100. For example, when the vehicle charging control apparatus 100 has a capacity to perform concurrent charging at 300 kW at a maximum, and the charging power of each vehicle is 30 kW, the vehicle charging control apparatus 100 is capable of concurrently charging ten of the vehicles 1. Thus, the power control unit 108 selects not more than ten power charging requests with the highest priorities. For the purpose of charging the vehicles 1 corresponding to the respective selected power charging requests, the power control unit 108 instructs the power receiving unit 106 to draw a unit amount of power from the power storage device 3 or the power grid 4, and instructs the power charging instruction unit 105 to charge the vehicles 1 with a unit amount of power. By doing this, the vehicles 1 each corresponding to the respective power charging requests with higher priorities are charged on a priority basis.

(Step S111) When an administrator shuts down the vehicle charging control apparatus 100, the vehicle charging control apparatus 100 ends the processing. When the vehicle charging control apparatus 100 is not shut down, the vehicle charging control apparatus 100 returns to Step S101 after a certain time.

As described above, the vehicle charging control apparatus 100 according to Embodiment 1 sets charging power unit prices for respective combinations of an allowable time and a request amount so as to keep a power supply-demand balance, and presents the charging power unit prices to a user. Considering the presented charging power unit prices, the user makes a power charging request specifying an allowable time and a request amount to the vehicle charging control apparatus 100. The vehicle charging control apparatus 100 receives the power charging request from the user and performs charging power control within the limit specified in the power charging request from the user. With this, the power supply-demand balance of the charging station 10 will be enhanced.

Figure 2:
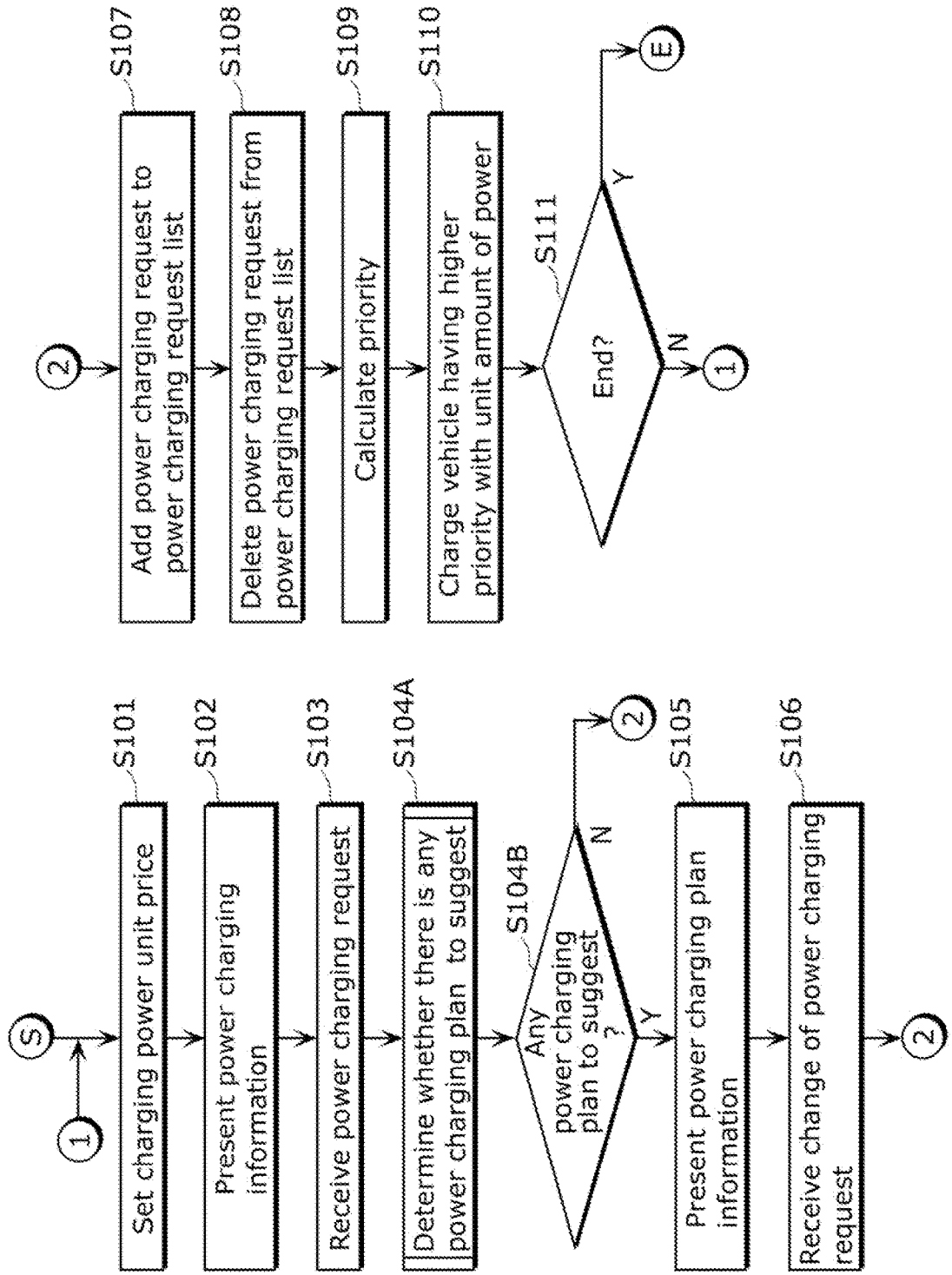
FIG. 2 is a flowchart showing a flow of processing to be performed by the vehicle charging control apparatus in Embodiment 1.

The method of determining priorities is not limited to the method in Step S109 in FIG. 2, in which a priority of each power charging request is determined based on a surplus time when the power charging request is received. For example, a time point by which the vehicle 1 is to leave the charging station 10 is determined by adding an allowable time to an input time of a power charging request. The time point is referred to as an allowable time point. Furthermore, a remaining request amount is determined by subtracting the amount of power already transferred to the vehicle 1 from the request amount. In this case, the priority calculation unit 107 may set a higher priority for a power charging request of a shorter remaining allowable time calculated by subtracting the amount of time necessary for charging of the remaining request amount from a time between the current time and the allowable time point. This determining of priorities may be performed at predetermined intervals or at a time when a power charging request list stored in the power charging request storing unit 104 is updated by adding or deleting a power charging request to or from the power charging request list.

The power charging information to be presented to a user is not limited to the above-described example of Embodiment 1 in which the power charging information is information on unit prices each associated with a request amount and an allowable time. For example, power charging information to be presented to a user may include a total power price instead of or along with a unit price.

Variation of Embodiment 1

In Embodiment 1, a unit price of charging power is calculated based on an allowable time and a request amount. In a variation of Embodiment 1, a unit price of charging power can be determined also based on a supply-demand situation of a charging station at a time of receiving a power charging request.

Figure 11:
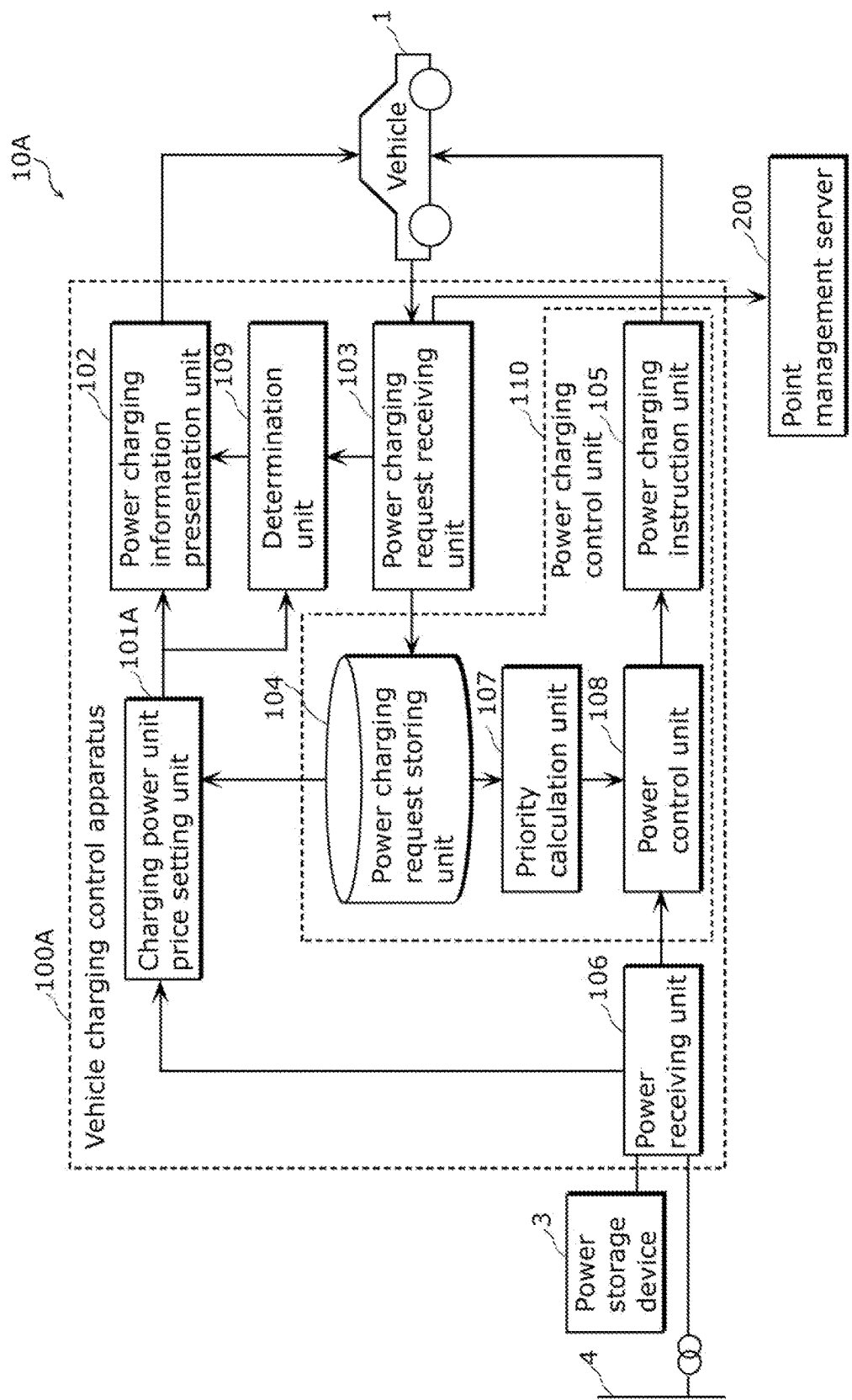
FIG. 11 is a block diagram of a charging station to which a vehicle charging control apparatus in a variation of Embodiment 1 is provided.

FIG. 11 shows a configuration of a charging station to which a vehicle charging control apparatus according to the present variation of Embodiment 1 is provided. A charging station 10A is provided with a vehicle charging control apparatus 100A.

As shown in FIG. 11, the vehicle charging control apparatus 100A in the present variation of Embodiment 1 includes a charging power unit price setting unit 101A instead of the charging power unit price setting unit 101 included in the vehicle charging control apparatus 100 in Embodiment 1. The charging power unit price setting unit 101A is different from the charging power unit price setting unit 101 in that the charging power unit price setting unit 101A receives power charging request stored in the power charging request storing unit 104 and power information received by the power receiving unit 106 as well.

In this configuration, the vehicle charging control apparatus 100A in the present variation of Embodiment 1 operates in the same manner as the vehicle charging control apparatus 100 in Embodiment 1 as shown in the flowchart in FIG. 2 but calculates a unit price using a different method in Step S101, (Step S101) The charging power unit price setting unit 101A sets unit prices of charging power. Each of the unit prices is associated with a request amount and an allowable time for recharging to be allowed by a user. The charging power unit price setting unit 101A sets each of the unit prices to be associated with a request amount and an allowable time so that the unit prices associated with equal ones of the request amounts are set lower when associated with a longer allowable time and so that the unit prices associated with equal ones of the allowable times are set lower when associated with a smaller request amount. Furthermore, the charging power unit price setting unit 101A sets each of the unit prices to be associated with a request amount and an allowable time so that the unit prices associated with equal ones of the request amounts and equal ones of the allowable times are set lower when a remaining power is larger. The remaining power is calculated by subtracting a combined charging power specified in power charging requests stored in the power charging request storing unit 104 from a supply capacity of the power receiving unit 106. The supply capacity of the power receiving unit 106 is a maximum power to supply which the power receiving unit 106 draws from the power storage device 3 or the power grid 4.

The following example shows a method of setting of a charging power unit price using Equations 4 and 5.

When a remaining power is greater than 100 kW, the charging power unit price setting unit 101A calculates a charging power unit price using Equation 4 below, as in Embodiment 1.

$$\text{Charging power unit price (yen/kWh)} = \text{base rate (e.g. 30 yen/kWh)} - \text{surplus time (minute)} \times \text{coefficient 1 (e.g. 0.2 yen/kWh/minute)} \quad \text{(Equation 4)}$$

(When a calculated charging power unit price is less than zero, the charging power unit price is deemed to be zero.)

When a remaining power is smaller than or equal to 100 kW, the charging power unit price setting unit 101A calculates a charging power unit price using Equation 5 below.

$$\text{Charging power unit price (yen/kWh)} = \text{base rate (e.g. 30 yen/kWh)} - \text{surplus time (minute)} \times \text{coefficient 1 (e.g. 0.2 yen/kWh/minute)} + \text{coefficient 2 (e.g. 1000 yen kW/kWh)/remaining power (kW)} \quad \text{(Equation 5)}$$

(When a calculated charging power unit price is less than zero, the charging power unit price is deemed to be zero.)

For example, when the power receiving unit 106 has a supply capacity of 700 kW, a power charging speed for each vehicle 1 is 30 kW, and the power charging request storing unit 104 stores 30 power charging requests, the remaining power is determined by calculating 1000−30×30. The calculated remaining power is 100 kW, and therefore the charging power unit price is 10 yen/kWh higher than that in Embodiment 1.

FIG. 12 shows power charging information for remaining power smaller than or equal to 100 kW. The power charging information is information on a unit price set to be associated with a request amount and an allowable time by the charging power unit price setting unit 101A. A field 171 lists charging power unit prices for combinations of an allowable time and a request amount. When the remaining power is larger than 100 kW, the power charging information is the same as shown in FIG. 4.

As described above, according to the present variation of Embodiment 1, a unit price of charging power can be determined in consideration not only of an allowable time and a request amount of a power charging request but also of a supply-demand situation of the charging station at a time of receiving a power charging request. As a result, a charging power unit price is set so as to further keep a power supply-demand balance of the charging station. More specifically, power demand can be kept low by setting a higher charging power unit price when the power supply-demand situation is tight.

The information usable for calculation of charging power unit price in the present variation of Embodiment 1 is not limited to the current power supply-demand situation. For example, a charging power unit price may be determined from a power supply-demand forecast for a time period from a reception of a power charging request to an expected time of the end of charging of a vehicle, based on information such as daily or hourly information or weather information correlated with past power supply capacity and power charging requests accumulated in history in relation to. This method is effective when a tight power supply-demand situation is expected for a charging time of a vehicle.

Embodiment 2

In the example of Embodiment 1, a unit price of charging power is calculated according to an allowable time and a request amount. In an example of Embodiment 2, a user can select the most favorable power charging plan, taking into account not only charging power unit prices but also parking fees.

Figure 13:
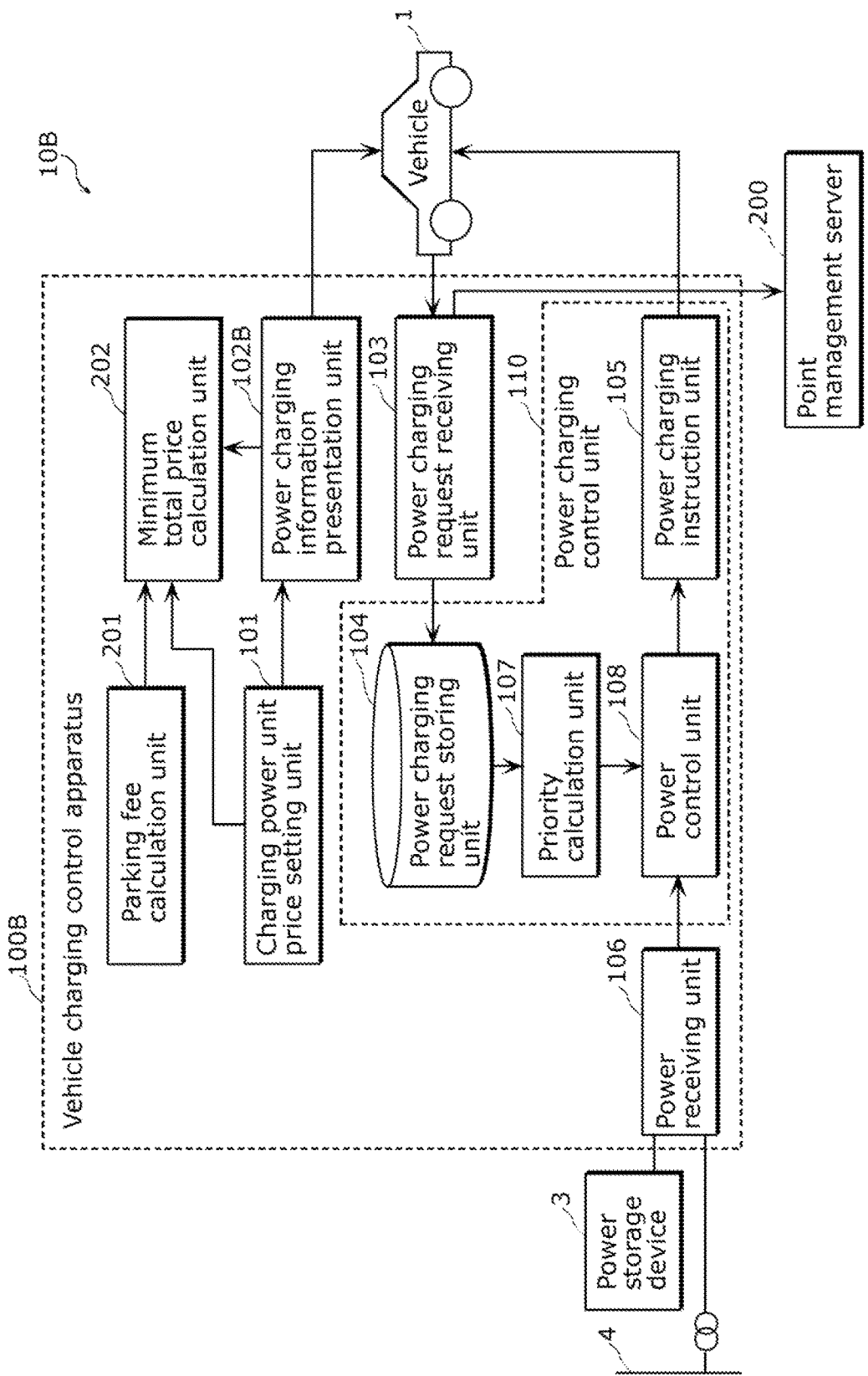
FIG. 13 is a block diagram of a charging station to which a vehicle charging control apparatus in Embodiment 2 is provided.

FIG. 13 shows a configuration of a charging station to which a vehicle charging control apparatus according to Embodiment 2 is provided.

A charging station 10B is provided with a vehicle charging control apparatus 100B.

As shown in FIG. 13, the vehicle charging control apparatus 100B according to Embodiment 2 includes the vehicle charging control apparatus 100 according to Embodiment 1 further including a parking fee calculation unit 201 and a minimum total amount calculation unit 202 but not including the determination unit 109, and also including a power charging information presentation unit 102B instead of the power charging information presentation unit 102. The other constituent elements are the same as those in Embodiment 1. The constituent elements also in Embodiment 1 are denoted with the same reference numerals, and detailed description thereof is omitted.

The parking fee calculation unit 201 calculates a parking fee according to a parking time of the vehicle 1 at the charging station 10B. In other words, the parking fee calculation unit 201 calculates a parking fee for a parking time which is considered as an allowable time.

The minimum total amount calculation unit 202 calculates, for each combination of a request amount and an allowable time, a total amount of a power price and a parking fee. The power price is a product of a request amount and a unit price set by the charging power unit price setting unit 101. The parking fee is a fee for parking of a vehicle at the charging station for the allowable time. The minimum total amount calculation unit 202 also calculates, for each request amount, an allowable time that minimizes the total amount.

The power charging information presentation unit 102B presents information indicating the total amounts calculated by the minimum total amount calculation unit 202 to a user.

Operation of the vehicle charging control apparatus 100B in the above-described configuration according to Embodiment 2 will be described below using a flowchart in FIG. 14.

For example, the vehicle charging control apparatus 100B is started up before operating hours of a charging station starts and keeps operating until an administrator instructs to shut down after the operating hours.

Figure 14:
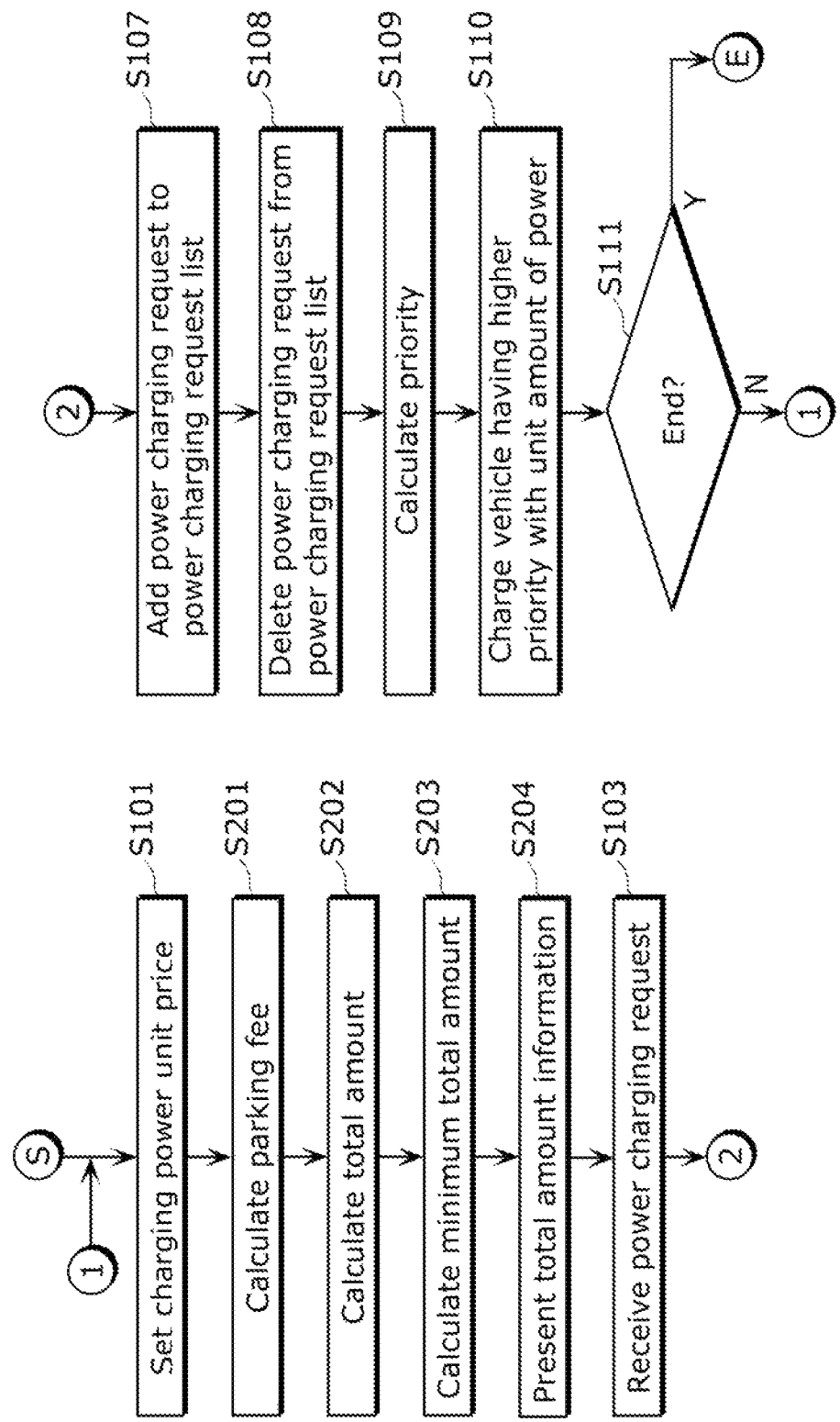
FIG. 14 is a flowchart showing a flow of processing to be performed by the vehicle charging control apparatus in Embodiment 2.

Since Step S101 shown in FIG. 14 is the same as in Embodiment 1, description thereof is omitted.

Figure 15:
FIG. 15 is a diagram illustrating a minimum total amount in Embodiment 2.

(Step S201) The parking fee calculation unit 201 calculates a parking fee according to a parking time of the vehicle 1 at the charging station 10B.

n Here, assume that the parking fee increases in proportion to the parking time. (a) in FIG. 15 shows an example of a fee structure of the parking fee in a field 212. For example, the field 212 shows that the parking fee for 60-minute parking is 100 yen, and the parking fee for 120-minute parking is 200 yen. In this parking fee structure, the parking time changes according to the parking time but may be fixed up to a certain parking time, and may have an upper limit.

(Step S202) The minimum total amount calculation unit 202 calculates a power price for each combination of an allowable time and a request amount by multiplying the charging power unit price set by the charging power unit price setting unit 101 by the request amount. Furthermore, the minimum total amount calculation unit 202 calculates, for each combination of an allowable time and a request amount, a total amount of the power price and the parking fee calculated by the parking fee calculation unit 201.

(a) in FIG. 15 shows an example of a structure of power prices in a field 211. The field 211 lists power prices calculated based on the charging power unit prices included in the power charging information in FIG. 4, (b) in FIG. 15 shows an example of a structure of total amounts in a field 213. The field 213 lists total amounts of the power prices in the field 211 and parking fees in the field 212. For example, when the allowable time is 60 minutes and the request amount is 5 kWh, the total amount is the sum of a power price of 100 yen and a parking fee of 100 yen, that is, 200 yen.

(Step S203) The minimum total amount calculation unit 202 calculates, for each request amount, an allowable time that minimizes the total amount.

In the field 213 listing the total amounts in (b) in FIG. 15, the allowable time which minimizes the total amount for each request amount is indicated by a thick frame. For example, the allowable time which minimizes the total amount for a request amount of 5 kWh is 60 minutes, and the total amount is 200 yen. The allowable time which minimizes the total amount for a request amount of 10 kWh is 120 minutes or 180 minutes, and the total amount is 300 yen.

(Step S204) The power charging information presentation unit 102B presents total amount information to the user of the vehicle 1 which has just come up to the charging station 10. More specifically, the power charging information presentation unit 102B sends the vehicle 1 total amount information as shown in FIG. 15.

Figure 16:
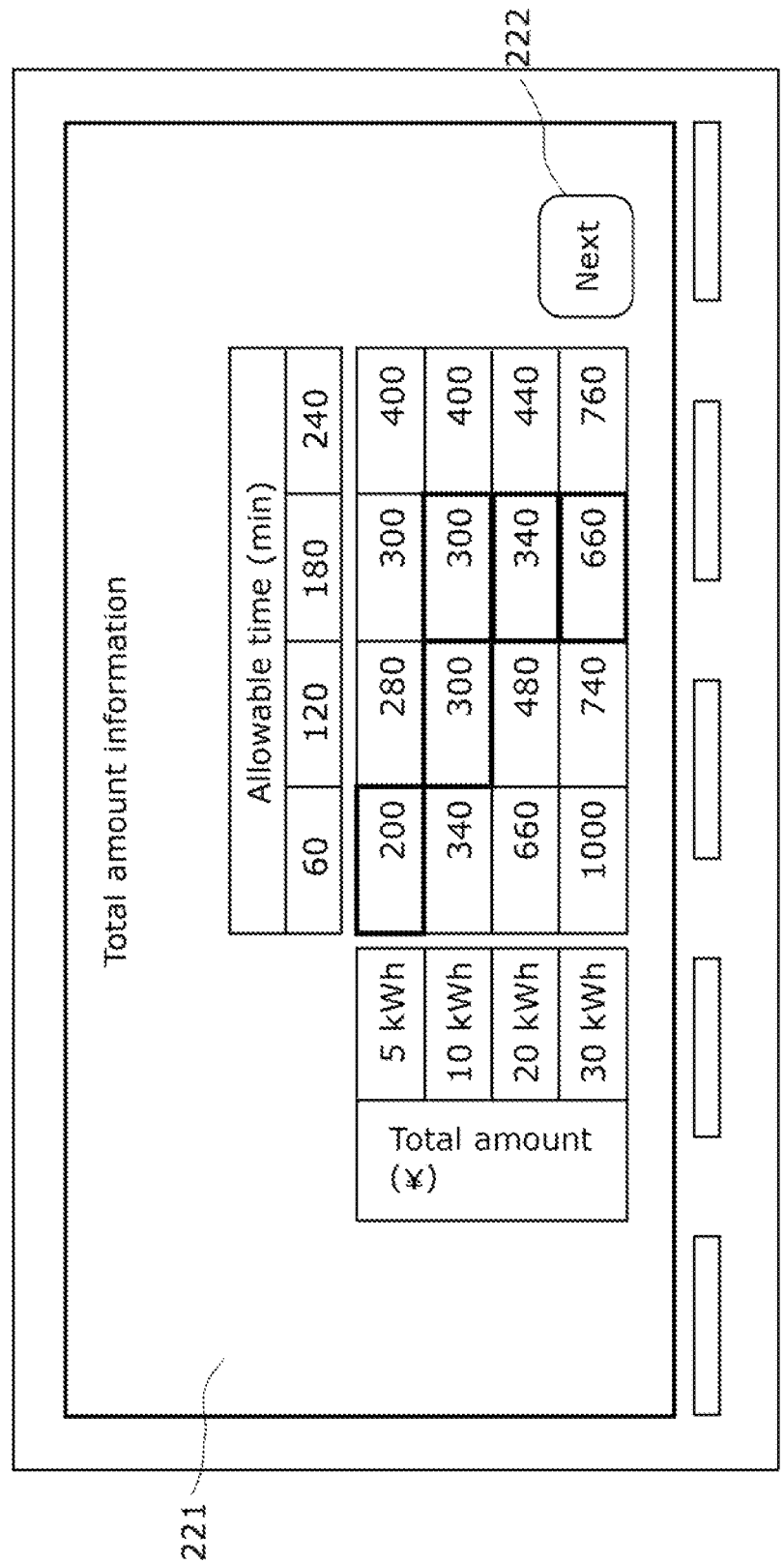
FIG. 16 shows an exemplary screen display of total amounts in Embodiment 2.

FIG. 16 shows an exemplary screen display of total amount information presented to a user through an operating device relevant to the vehicle 1, such as a terminal installed at the charging station 10B, an on-vehicle terminal of the vehicle 1, or a mobile information terminal carried by the user.

In FIG. 16, a field 221 shows total amount information on request amounts, allowable times, and total amounts associated with one another. When the user checks the total amounts in the total amount information and presses a "Next" button 222, the operating device returns a signal to proceed to Step S103 to the vehicle charging control apparatus 100B.

Since Steps S103 to S107 and S111 are the same as in Embodiment 1, description thereof is omitted.

As described above, according to Embodiment 2, the vehicle charging control apparatus 100B presents to a user not only a power price but also a parking fee as a total amount. This allows the user to select the most favorable power charging plan. Furthermore, the power price is set for each combination of an allowable time and a request amount so as to keep a power supply-demand balance. The vehicle charging control apparatus 100B receives a power charging request from the user and performs charging power control within the limit specified in the power charging request from the user. With this, the power supply-demand balance of the charging station 10 will be enhanced.

The information presented to a user in Embodiment 2 is not limited to total amount information on request amounts, allowable times, and total amounts associated with one another as in the above-described example. Instead of the total amount information, a user may be presented with power charging information which is information on unit prices each associated with a request amount and an allowable time. In this case, this unit price includes a parking fee. In other words, the unit price has a value calculated by dividing a total amount of a power price and a parking fee by a request amount. A user can see which combination of a request amount and an allowable time is comparatively low from the unit prices. The unit prices may be presented to a user along with total amounts.

Embodiment 3

In the example of Embodiment 1, a power charging request is received from a user when the vehicle 1 comes up to a charging station. In an example of Embodiment 3, the user can change the power charging request not only when the vehicle 1 comes up to a charging station but also when the vehicle 1 is being charged.

Figure 17:
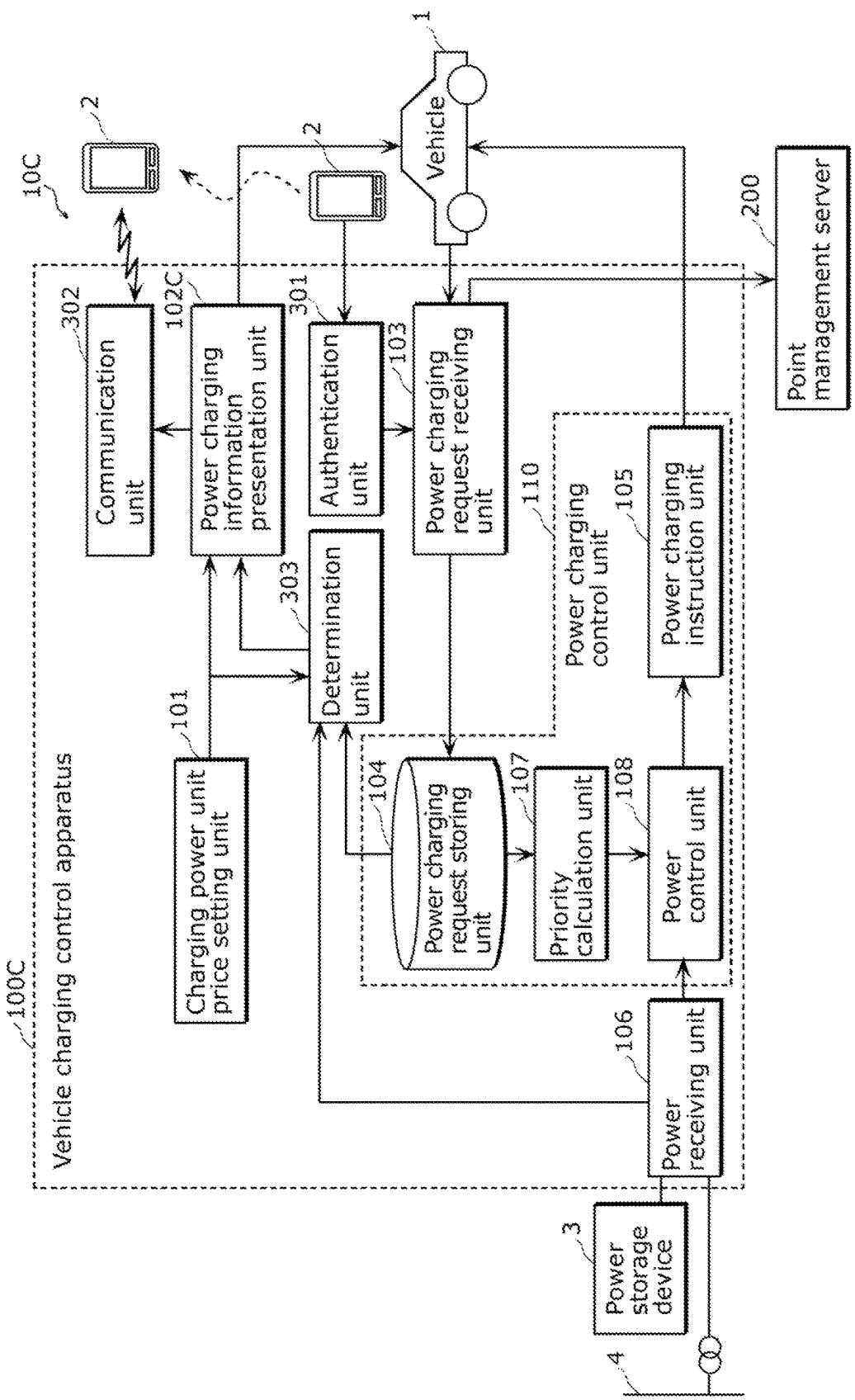
FIG. 17 is a block diagram of a charging station to which a vehicle charging control apparatus in Embodiment 3 is provided.

FIG. 17 shows a configuration of a charging station to which a vehicle charging control apparatus according to Embodiment 3 is provided.

A charging station 10C is provided with a vehicle charging control apparatus 100C.

As shown in FIG. 17, the vehicle charging control apparatus 100C in Embodiment 3 includes the vehicle charging control apparatus 100 according to Embodiment 1 further including an authentication unit 301, a communication unit. 302, and a determination unit 303 but not including the determination unit 109, and also including a power charging information presentation unit 102C instead of the power charging information presentation unit 102. Furthermore, a user of the vehicle 1 carries a mobile information terminal 2 with the user. The other constituent elements are the same as those in Embodiment 1. The constituent elements also in Embodiment 1 are denoted with the same reference numerals, and detailed description thereof is omitted.

The mobile information terminal 2, carried by the user, is ready for communication of information with the vehicle charging control apparatus 100C according to Embodiment 3.

The authentication unit 301 authenticates the mobile information terminal 2 to associate the mobile information terminal 2 with the vehicle 1.

The communication unit 302 transmits and receives information to and from the mobile information terminal 2.

The power charging information presentation unit 102C causes, through the communication unit 302, the mobile information terminal 2 to present information to ask for a change of a power charging request.

The determination unit 303 determines whether or not to ask for a change of a power charging request, according to a supply-demand situation of the charging station 10C.

Figure 18:
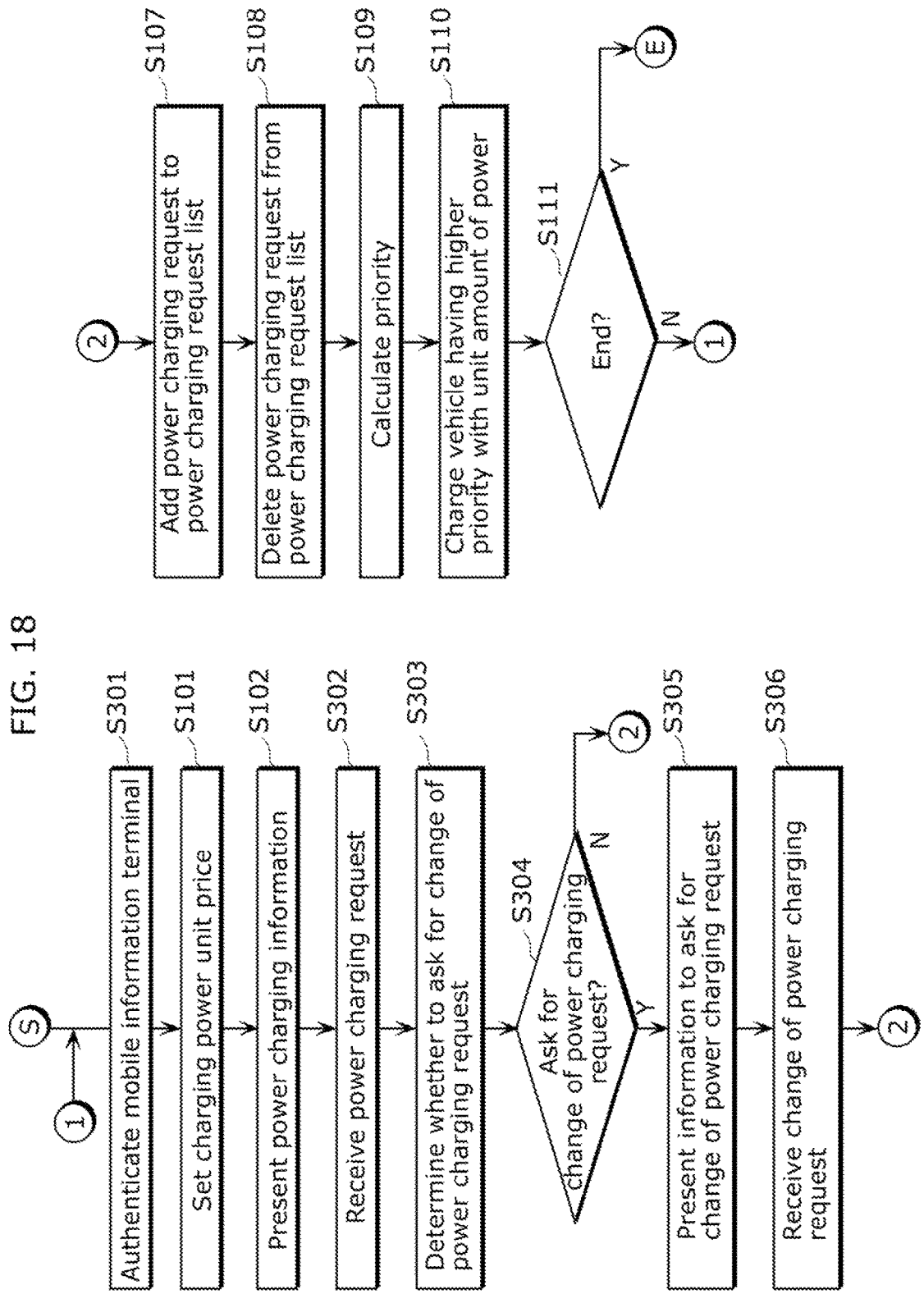
FIG. 18 is a flowchart showing a flow of processing to be performed by the vehicle charging control apparatus in Embodiment 3.

Operation of the vehicle charging control apparatus 100C in the above-described configuration according to Embodiment 3 will be described below using a flowchart in FIG. 18.

For example, the vehicle charging control apparatus 100C is started up before operating hours of a charging station starts and keeps operating until an administrator instructs to shut down after the operating hours.

Step S301) The authentication unit 301 authenticates the mobile information terminal 2 carried by the user of the vehicle 1 which has just come up to the charging station 10C to associate the mobile information terminal 2 with the vehicle 1 which the user has driven up there.

The authentication may be performed in any manner to associate the vehicle 1 and the mobile information terminal 2 which belong to the same user. For example, the authentication may be performed so as to associate the number of the space where the vehicle 1 is parked and a mail address of the mobile information terminal 2 provided upon the parking or registered in advance as membership information.

Since Steps S101 and S102 are the same as in Embodiment 1, description thereof is omitted.

(Step S302) The power charging request receiving unit 103 receives a power charging request from the user of the vehicle 1, and stores, in the power charging request storing unit 104, the power charging request so that the power charging request is associated with the mobile information terminal 2.

Since the reception of a power charging request is performed in the same manner as in Embodiment 1, description thereof is omitted.

(Step S303) The determination unit 303 determines whether or not to ask the user for a change of the power charging request, according to a supply-demand situation of the charging station. More specifically, when remaining power decreases below a predetermine threshold, the determination unit 303 determines to ask the user for a change of the power charging request. Otherwise, the determination unit 303 does not ask for such a change. The remaining power is calculated by subtracting a combined charging power specified in power charging requests stored in the power charging request storing unit 104 from a supply capacity of the power receiving unit 106 as described in the variation of Embodiment 1.

(Step S304) When the determination unit 303 determines to ask the user for a change of the power charging request, the processing then proceeds to Step S305. Otherwise, the processing proceeds to Step S102.

(Step S305) The power charging information presentation unit 102C transmits information to ask for a change of the power charging request to the mobile information terminal 2 via the communication unit 302. Upon receiving the information, the mobile information terminal 2 displays the information.

Since the user carries the mobile information terminal 2, it is possible for the power charging information presentation unit 102C to show the user the information to ask for a change of a power charging request even though the user is likely to be away from the parking space of the vehicle 1 while the vehicle 1 is being charged.

The power charging information presentation unit 102C presents the information to the user by causing the mobile information terminal 2 to display the information described for Step S105 in Embodiment 1 as shown in FIG. 8.

Figure 19:
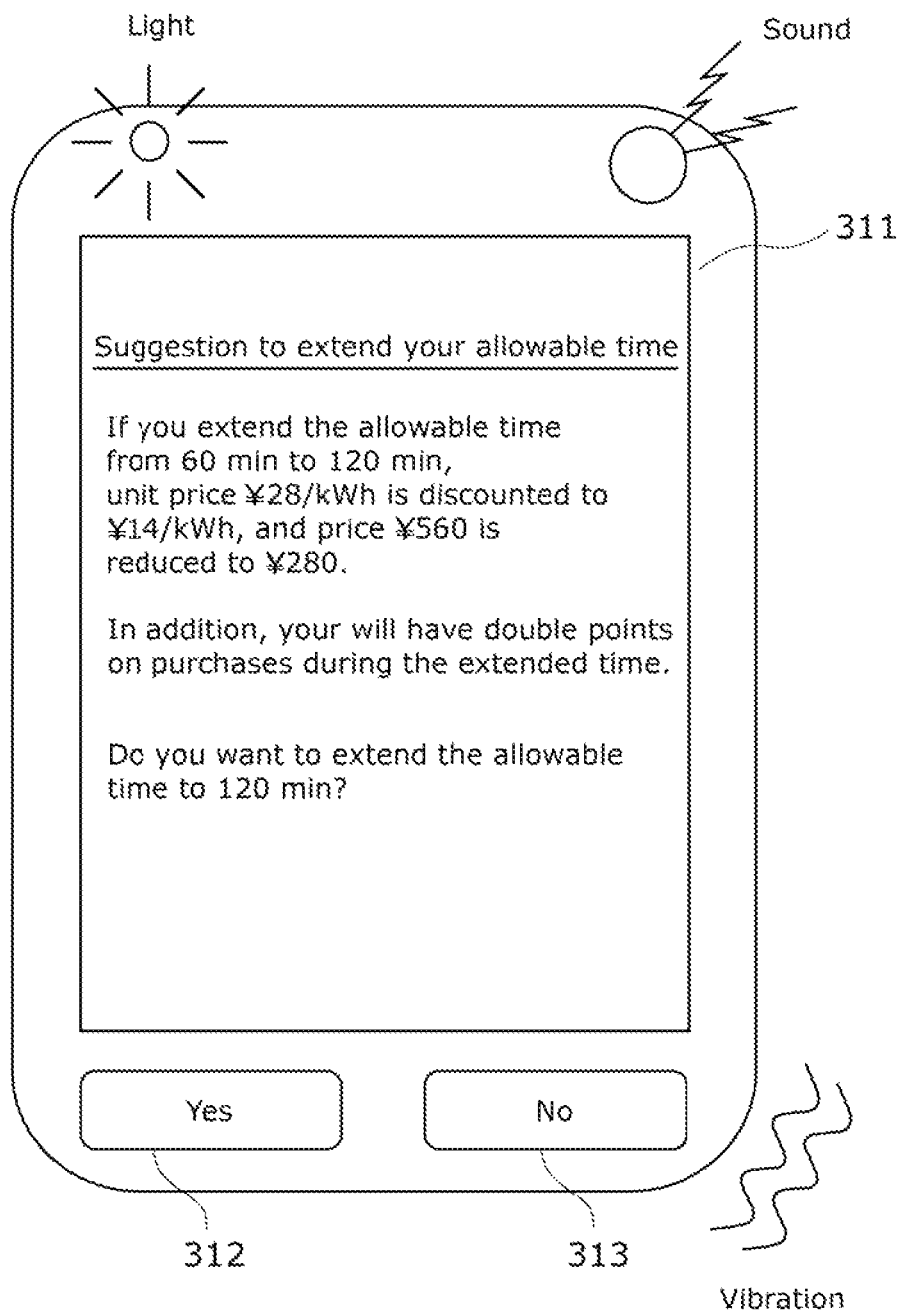
FIG. 19 shows an exemplary screen display to ask for extension of an allowable time in Embodiment 3.

FIG. 19 shows an exemplary screen display shown on the mobile information terminal 2 to ask the user for extension of an allowable time. Light, sound, vibration or the like may be used in order to notify the user of presence of information to be presented.

In FIG. 19, a display screen 311 shows information on benefit to be given to the user in return for accepting the suggestion to extend the allowable time.

Figure 20:
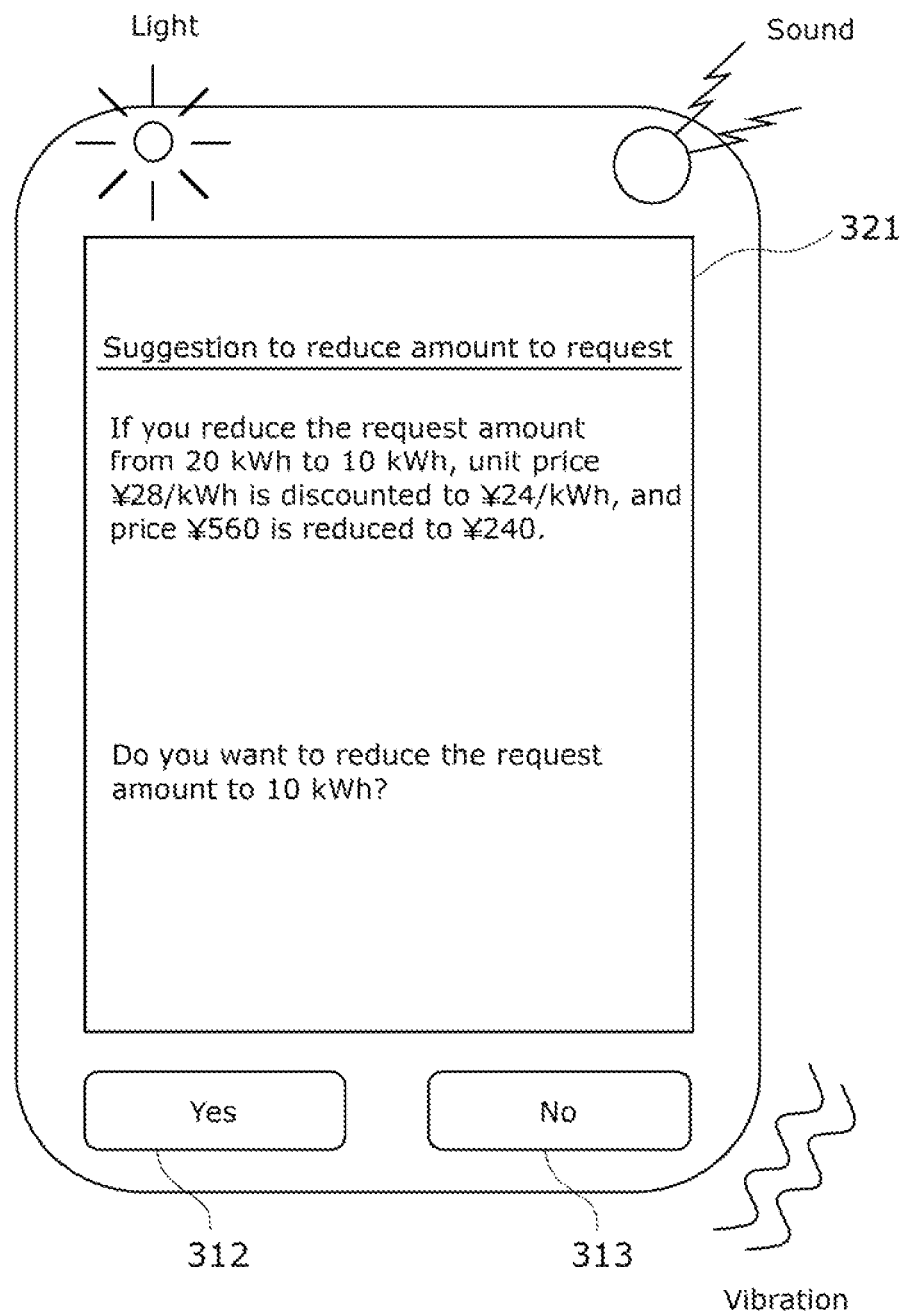
FIG. 20 shows an exemplary screen display to ask for reduction of a request amount in Embodiment 3.

FIG. 20 shows an exemplary screen display shown on the mobile information terminal 2 to ask the user for reduction of request amount. Light, sound, vibration or the like may be used in order to notify the user of presence of information to be presented.

In FIG. 20, a display screen 321 shows information on benefit to be given to the user in return for accepting the suggestion to reduce the request amount.

(Step S106) The power charging request receiving unit 103 receives an input from the user in response to the presentation of the information to ask the user for a change of the power charging request in Step S305.

In FIG. 19, when the user presses a "Yes" button 312, the power charging request receiving unit 103 receives the extended allowable time and changes the allowable time specified in the power charging request of the user to the extended allowable time. Furthermore, the power charging request receiving unit 103 requests the point management server 200 to double points on purchases of the user. The point management server 200 manages of point information of users. When the user presses a "No" button 313, the power charging request of the user remains unchanged.

In FIG. 20, when the user presses a "Yes" button 312, the power charging request receiving unit 103 receives the reduced request amount and changes the request amount specified in the power charging request of the user to the reduced request amount. When the user presses a "No" button 313, the power charging request of the user remains unchanged.

Since Steps S107 to S111 are the same as in Embodiment 1, description thereof is omitted.

As described above, according to Embodiment 3, a user can change a power charging request not only when the user is present at the charging station with the user's vehicle but also when the user is away from the vehicle in the midst of charging. With this, it is possible to suggest a user to change a power charging request when the power supply-demand situation is tight, and consequently power demand is kept low.

The vehicle charging control apparatus according to any one of above-described embodiments can be implemented using a computer.

Figure 21:
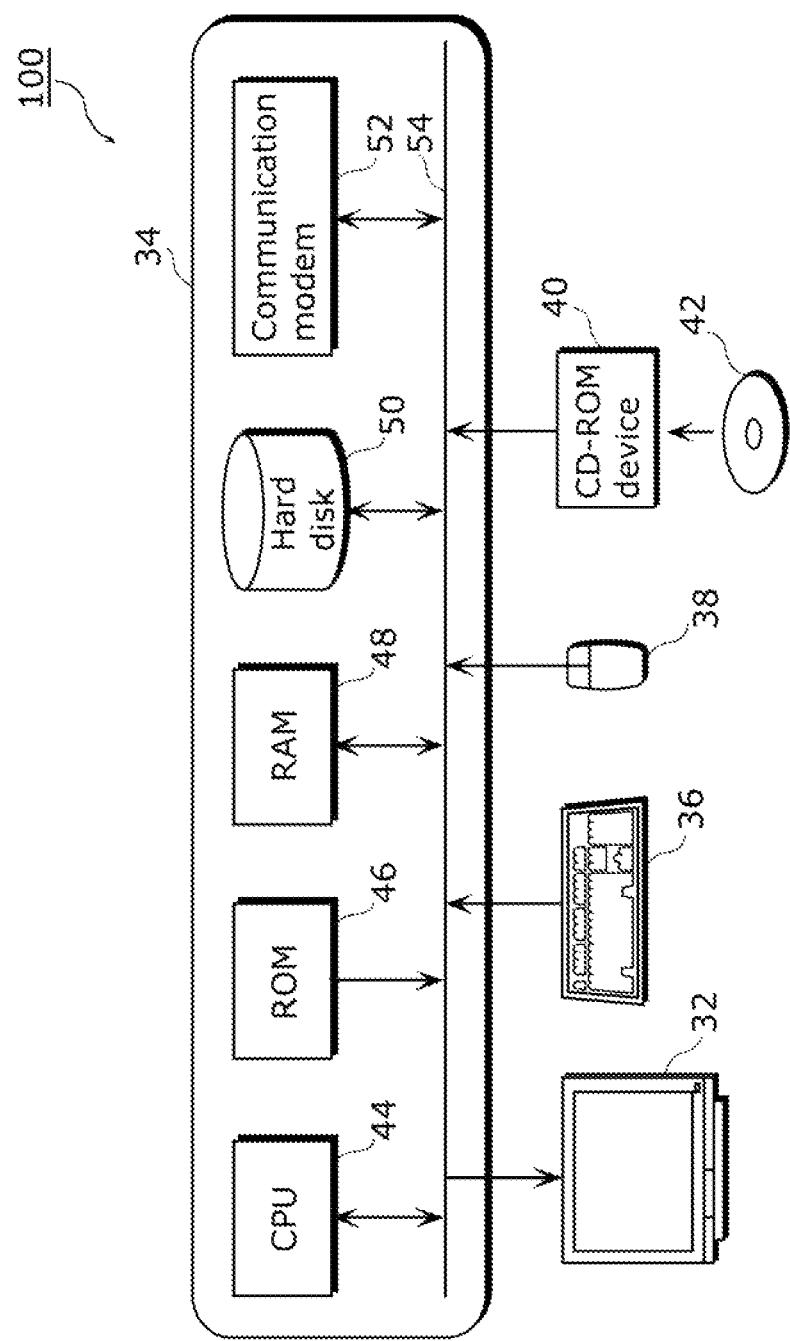
FIG. 21 is block diagram showing a hardware configuration to implement the vehicle charging control apparatus according to any one of Embodiments 1 to 3.

FIG. 21 is block diagram showing a hardware configuration to implement the vehicle charging control apparatus 100. This hardware configuration is applicable also to any one of the vehicle charging control apparatuses 100A to 100C and a vehicle charging control apparatus 100D which will be described later.

The vehicle charging control apparatus 100 includes a computer 34, a keyboard 36 and a mouse 38 to issue instructions to the computer 34, a display 32 to present information such as a result of calculation by the computer 34, a compact disc read-only memory (CD-ROM) device 40 to read a program to be executed by the computer 34, and a communication modem (not shown in the drawings).

The program of processing to be executed by the vehicle charging control apparatus 100 is stored in a CD-ROM 42, which is a computer-readable recording medium, and read by the CD-ROM device 40. Alternatively, the program may be read by the communication modem 52 through a computer network.

The computer 34 includes a central processing unit (CPU) 44, read-only memory (ROM) 46, random access memory (RAM) 48, a hard disk 50, a communication modem 52, and a bus 54.

The CPU 44 executes the program read through the CD-ROM device 40 or the communication modem 52. The ROM 46 stores a program or data necessary for the computer 34 to operate. The RAM 48 stores data such as a parameter when a program is executed. The hard disk 50 stores a program or data. The communication modem 52 communicates with another computer through a computer network. The bus 54 interconnects the CPU 44, the ROM 46, the RAM 48, the hard disk 50, the communication modem 52, the display 32, the keyboard 36, the mouse 38, and the CD-ROM device 40.

All or part of the components of each of the apparatus may be composed of a system large-scale integration (LSI). The system LSI is a super-multifunctional LSI manufactured by integrating constituent units on one chip, and is specifically a computer system including a microprocessor, ROM, and RAM. The RAM stores a computer program. The microprocessor operates according to the computer program so that the system LSI can perform its function.

Furthermore, all or part of the constituent elements constituting the respective devices may be configured as an IC card or as a unit of a module which can be attached to and detached from the respective devices. Each of the IC card and the module is a computer system including components such as a microprocessor, a ROM, and a RAM. The IC card or the module may include the above-mentioned super-multifunctional LSI. The microprocessor operates according to the computer program so that the system LSI can perform its function. The IC card and the module may be tamper-proofed.

The present disclosure may also be implemented as the methods described above. The present disclosure may be implemented as a computer program for realizing the methods, using a computer, and may also be a digital signal indicating the computer program.

The present disclosure may also be implemented as a computer-readable recording medium, such as a flexible disk, a hard disc, a CD-ROM, an MO, a DVD, a DVD-ROM, a DVD-RAM, Blu-ray Disc (BD), a semiconductor memory, or the like on which the computer program or the digital signal is recorded (Blu-ray Disc is a registered trademark). Furthermore, the present disclosure may also be implemented as the digital signal recorded on such a recording medium.

Furthermore, the present disclosure may also be implemented as the computer program or the digital signal transmitted via an electric telecommunication line, wired or wireless communication line, a network represented by the Internet, or data broadcasting.

Furthermore, the present disclosure may also be implemented as a computer system including a microprocessor and a memory, where the memory stores the computer program, and the microprocessor operates according to the computer program.

In other words, the computer program causes a computer to execute a vehicle charging control method. The vehicle charging control method is a method of controls charging of a plurality of vehicles parked at a charging station and includes presenting, to a user of each of the vehicles, unit prices of charging power each of which is associated with a request amount of the charging power and an allowable time which is an amount of time that the user allows for the charging, the unit prices associated with equal ones of the request amounts being set lower when associated with a longer one of the allowable times, and the unit prices associated with equal ones of the allowable times being set lower when associated with a smaller one of the request amounts; receiving power charging requests from the users, each of the power charging requests specifying a request amount of the charging power and an allowable time for the charging; issuing an instruction for preferentially charging a vehicle among the vehicles for which the specified allowable time is short in proportion to the request amount, based on the power charging requests received in the receiving; and determining, with reference to the set unit prices, whether or not there is another allowable time which is associated with the request amount specified in the power charging request and meets a first condition that (i) the other allowable time is longer than the allowable time specified in the power charging request and (ii) the unit price associated with the other allowable time is lower than the unit price associated with the request amount and the allowable time specified in the power charging request, wherein when it is determined in the determining that there is the other allowable time which meets the first condition, in the presenting, the user is further presented with the other allowable time which meets the first condition and the unit price associated with the other allowable time which meets the first condition.

Furthermore, the present disclosure may be implemented as the program or the digital signal recorded on the recording medium and transmitted, or transmitted via the network to be executed on a different independent computer system.

Furthermore, the present disclosure may be implemented as a combination of the above-described embodiments and variation thereof. For example, the vehicle charging control apparatus 100B in Embodiment 2 may further include a constituent element such as the determination unit 109 in Embodiment 1.

Figure 22:
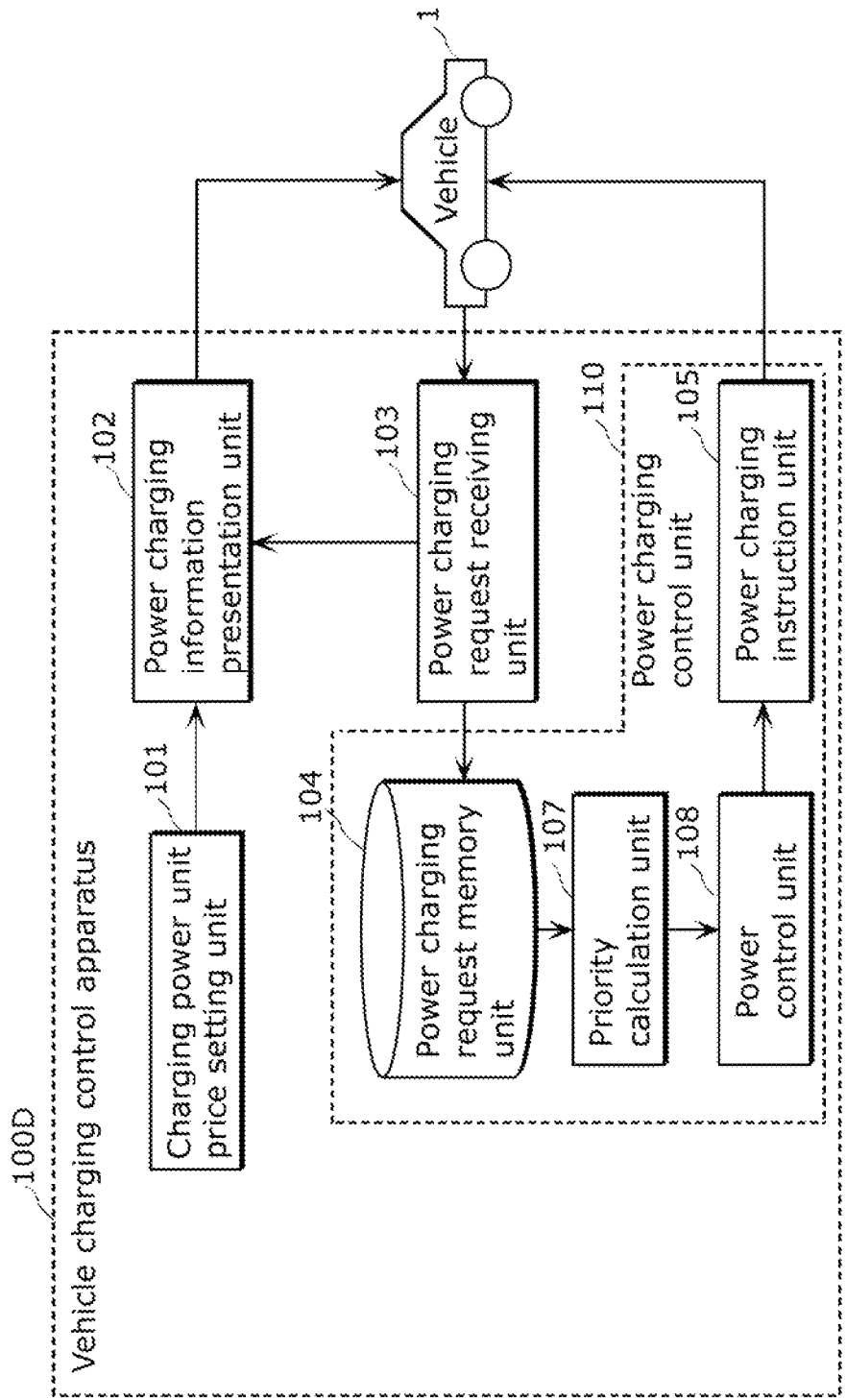
FIG. 22 is a block diagram of a vehicle charging control apparatus including constituent elements necessary to achieve the functions according to the present invention.

FIG. 22 is a block diagram of a vehicle charging control apparatus including constituent elements necessary to achieve the functions according to the present invention. The vehicle charging control apparatus 100D includes the charging power unit price setting unit 101, the power charging information presentation unit 102, the power charging request receiving unit 103, and the power charging control unit 110. The power charging control unit 110 includes the power charging request storing unit 104, the power charging instruction unit 105, the priority calculation unit 107, and the power control unit 108. The other constituent elements are the same as those in Embodiment 1. The constituent elements other than them may be included but not necessary to implement the present invention.

The vehicle charging control apparatuses according to one or more aspects have been described based on the exemplary embodiments, but the present invention is not limited to the exemplary embodiments. Variations of any of the exemplary embodiments which would occur to those skilled in the art and embodiments in which the constituent elements in the present embodiments or the variations thereof, are also within the scope of one of more of the aspects of the present invention unless they depart from the spirit and scope of the present invention.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The vehicle charging control apparatus according to one or more exemplary embodiments disclosed herein is capable of charging vehicles without Exceeding installed capacity of a charging station or undermining users benefit, and thus applicable to a charging apparatus for a charging station.

The invention claimed is:

1. A vehicle charger which charges vehicles parked at a charging station, the vehicle charger comprising:
a processor, and a non-transitory computer-readable memory having stored therein a program to be executed by the processor causing the vehicle charger, including the processor and memory, to function as:
a calculation unit configured to calculate, for each combination of a request amount and an allowable time, a total amount of a power price and a parking fee, the power price being a product of a set unit price and the request amount, the parking fee being a fee for parking of a vehicle, of the vehicles, at the charging station for the allowable time;
a power charging information presentation unit configured to display, to respective users of each of the vehicles, a first screen showing information indicating the total amounts calculated by the calculation unit and a unit price table in which (i) unit prices of charging power, (ii) request amounts of the charging power, and (iii) allowable times are arranged in a matrix, wherein each combination of the request amounts and allowable times is associated with a corresponding one of the unit prices, wherein each allowable time is an amount of time that a user, of the users, agrees to allow for charging to be completed, and wherein for each request amount in the unit price table, the unit price is lower the longer the associated allowable time is, and for each allowable time in the unit price table, the unit price is lower the smaller the associated requested amount is;
a power charging request receiving unit configured to receive power charging requests from the users, each of the power charging requests specifying a request amount of the charging power and an allowable time for charging;
a determination unit configured to determine, with reference to the unit price table, whether or not there is another allowable time which is associated with the request amount specified in the power charging request and meets a first condition that (i) the other allowable time is longer than the allowable time specified in the power charging request and (ii) the unit price associated with the other allowable time is lower than the unit price associated with the request amount and the allowable time specified in the power charging request,
wherein when the determination unit determines that there is the other allowable time which meets the first condition, the power charging information presentation unit is further configured to change the first screen showing the unit price table into a second screen including the other allowable time which meets the first condition and the unit price associated with the other allowable time which meets the first condition;
a priority calculation unit configured to determine a priority order of charging of the vehicles by prioritizing the charging requests associated with the vehicles according to a proportion of allowable time per requested amount;
a power receiving unit, connected to a power source, configured to selectively draw power from the power source; and
a power charging control unit configured to: control the power receiving unit to cause the power receiving unit to draw power from the power source; and direct the power to the vehicles in order according to the calculated priority order.

2. The vehicle charger according to claim 1, wherein the program causes the vehicle charger, including the processor and memory, to further function as:
a charging power unit price setting unit configured to determine a surplus time by subtracting an amount of time necessary for charging of the request amount from the allowable time,
wherein the unit prices associated with the same request amount are lower when also associated with a longer surplus time.

3. The vehicle charger according to claim 1,
wherein the unit prices associated with the same request amount and the same allowable time are lower when a combined charging power for the charging according to the power charging requests received by the power charging request receiving unit is smaller.

4. The vehicle charger according to claim 3,
wherein the unit prices associated with the same request amount and the same allowable time are lower when a remaining power is larger, the remaining power being calculated by subtracting the combined charging power from a power that can be concurrently supplied to the vehicles parked at the charging station.

5. The vehicle charger according to claim 1,
wherein the power charging information presentation unit is configured to further display incentive information which indicates an incentive for the user to extend the allowable time.

6. The vehicle charger according to claim 1,
wherein the determination unit is further configured to determine, with reference to the set unit prices, whether or not there is another request amount which is associated with the allowable time specified in the power charging request and meets a second condition that (i) the other request amount is smaller than the request amount specified in the power charging request and (ii) the unit price associated with the other allowable time is lower than the unit price associated with the request amount and the allowable time specified in the power charging request, and when the determination unit determines that there is the other request amount which meets the second condition, the power charging information presentation unit is further configured to display the amount of charging power which meets the second condition and the unit price associated with the other allowable time which meets the second condition.

7. The vehicle charger according to claim 1,
wherein the calculation unit is further configured to calculate, for each of the request amounts, a minimum total amount from among the total amounts for the combinations including the request amount, and the power charging information presentation unit is configured to present, to the user, the minimum of the total amount calculated for each of the request amounts by the calculation unit instead of the unit price.

8. The vehicle charger according to claim 1, wherein the program causes the vehicle charger, including the processor and memory, to further function as:
a communication unit configured to transmit and receive information,
wherein when a remaining power decreases below a predetermined value while the vehicles parked at the charging station are being charged, the power charging information presentation unit is configured to transmit, via the communication unit, information to ask the users for extension of the allowable times or information to ask the users for reduction of the request amounts to information terminals each associated with a corresponding one of the vehicles being charged, the remaining power being calculated by subtracting, from a power that can be concurrently supplied to the vehicles, a combined charging power for the charging according to the power charging requests received by the power charging request receiving unit, and the power charging request receiving unit is configured to receive the power charging request from the information terminals via the communication unit.

9. An information terminal for use in connection with the vehicle charger according to claim 8 and configured to receive, from a vehicle charging control apparatus, the information to ask the users for extension of the allowable times or information to ask the users for reduction of the request amounts.

10. A vehicle charging method of charging a plurality of vehicles parked at a charging station, comprising:
calculating, for each combination of a request amount and an allowable time, a total amount of a power price and a parking fee, the power price being a product of a set unit price and the request amount, the parking fee being a fee for parking of a vehicle, of the plurality of vehicles, at the charging station for the allowable time;

displaying, to respective users of each of the plurality of vehicles, a first screen showing information indicating the total amounts calculated in the calculating and a unit price table in which (i) unit prices of charging power, (ii) request amounts of the charging power, and (iii) allowable times are arranged in a matrix, wherein each combination of the request amounts and allowable times is associated with a corresponding one of the unit prices, wherein each allowable time is an amount of time that a user, of the users, agrees to allow for charging to be completed, and wherein for each request amount in the unit price table, the unit price is lower the longer the associated allowable time is, and for each allowable time in the unit price table, the unit price is lower the smaller the associated requested amount is;

receiving power charging requests from the users, each of the power charging requests specifying a request amount of the charging power and an allowable time for the charging;

determining, with reference to the unit price table, whether or not there is another allowable time which is associated with the request amount specified in the power charging request and meets a first condition that (i) the other allowable time is longer than the allowable time specified in the power charging request and (ii) the unit price associated with the other allowable time is lower than the unit price associated with the request amount and the allowable time specified in the power charging request, wherein when it is determined in the determining that there is the other allowable time which meets the first condition, in the displaying, changing the first screen showing the unit price table into a second screen including the other allowable time which meets the first condition;

determining a priority order of charging of the plurality of vehicles by prioritizing the charging requests associated with the plurality of vehicles according to a proportion of allowable time per requested amount; and automatically controlling a power receiving unit to cause the power receiving unit to draw power from a power source, and directing the power to the plurality of vehicles in order according to the calculated priority order.

* * * * *